(12) United States Patent
Seo et al.

(10) Patent No.: US 10,560,971 B2
(45) Date of Patent: Feb. 11, 2020

(54) WIRELESS COMMUNICATION METHOD AND ELECTRONIC DEVICE FOR PROVIDING SAME

(71) Applicant: Samsung Electronics Co., Ltd., Gyeonggi-do (KR)

(72) Inventors: Jungkuk Seo, Gyeongsangbuk-do (KR); Jaecheol Kwon, Daegu (KR); Yukyung Kim, Daegu (KR); Seungyun Song, Daegu (KR); Seungjae Lee, Daegu (KR); Jongmu Choi, Gyeonggi-do (KR); Sungjun Kim, Daegu (KR); Janghoon Lee, Gyeongsangbuk-do (KR); Yeunwook Lim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/775,106

(22) PCT Filed: Nov. 9, 2016

(86) PCT No.: PCT/KR2016/012873
§ 371 (c)(1),
(2) Date: May 10, 2018

(87) PCT Pub. No.: WO2017/086656
PCT Pub. Date: May 26, 2017

(65) Prior Publication Data
US 2018/0338336 A1 Nov. 22, 2018

(30) Foreign Application Priority Data
Nov. 19, 2015 (KR) .................. 10-2015-0162372

(51) Int. Cl.
*H04W 76/10* (2018.01)
*H04W 8/26* (2009.01)
(Continued)

(52) U.S. Cl.
CPC ............. *H04W 76/10* (2018.02); *H04W 8/26* (2013.01); *H04W 72/0453* (2013.01);
(Continued)

(58) Field of Classification Search
None
See application file for complete search history.

(56) References Cited

U.S. PATENT DOCUMENTS

| | | |
|---|---|---|
| 2013/0077542 A1 | 3/2013 | Yang et al. |
| 2013/0148162 A1 | 6/2013 | Park et al. |

(Continued)

FOREIGN PATENT DOCUMENTS

| | | |
|---|---|---|
| KR | 10-2011-0133043 A | 12/2011 |
| KR | 10-2012-0126860 A | 11/2012 |

(Continued)

OTHER PUBLICATIONS

Kyounghee Lee, "Research on the Implementation of the Virtual Interface on Multi-mode Mobile Nodes", The Journal of the Korean INstitute of Communication Sciences 35(4), (Network & Services), pp. 677-686, Apr. 2010 (http://www.dbpia.co.kr/Journal/ArticleDetail/NODE01424939).

(Continued)

*Primary Examiner* — Diane L Lo
(74) *Attorney, Agent, or Firm* — Cha & Reiter, LLC

(57) ABSTRACT

The present invention may include an electronic device comprising: a communication module for supporting first short-range wireless communication and second short-range wireless communication; and a processor which is functionally connected to the communication module, wherein the processor is configured to: establish a connection to a first external device over at least one channel in a band through the communication module, using the first short-range wireless communication; while the connection to the first exter- (Continued)

nal device is established, identify a request for performing the second short-range wireless communication with a second external device; and connect the second external device to the first external device or an external communication server over the at least one channel in the band, using the second short-range wireless communication, in response to the request. However, the present invention is not limited to the above-described embodiment, and may include other embodiments.

16 Claims, 19 Drawing Sheets

(51) Int. Cl.
    *H04W 88/06* (2009.01)
    *H04W 88/04* (2009.01)
    *H04W 72/04* (2009.01)
    *H04W 84/12* (2009.01)

(52) U.S. Cl.
    CPC .......... *H04W 88/04* (2013.01); *H04W 88/06* (2013.01); *H04W 84/12* (2013.01)

(56) References Cited

U.S. PATENT DOCUMENTS

| | | |
|---|---|---|
| 2013/0235814 A1 | 9/2013 | Wieffeldt et al. |
| 2014/0010219 A1 | 6/2014 | Dor et al. |
| 2014/0323048 A1 | 10/2014 | Kang |
| 2015/0065052 A1 | 3/2015 | Heo et al. |
| 2015/0117421 A1 | 4/2015 | Kim et al. |
| 2015/0230093 A1 | 8/2015 | Park et al. |
| 2015/0282195 A1 | 10/2015 | Farhadi |
| 2015/0304800 A1 | 10/2015 | Son et al. |
| 2016/0278151 A1 | 9/2016 | Kwon et al. |

FOREIGN PATENT DOCUMENTS

| | | |
|---|---|---|
| KR | 10-2013-0066553 A | 6/2013 |
| KR | 10-2014-0019504 A | 2/2014 |
| KR | 10-2014-0128039 A | 11/2014 |
| KR | 10-2015-0026650 A | 3/2015 |
| KR | 10-2015-0034762 A | 4/2015 |
| KR | 10-2015-0049947 A | 5/2015 |
| WO | 2013/133928 A1 | 9/2013 |
| WO | 2014/069758 A1 | 5/2014 |
| WO | 2015/069024 A1 | 5/2015 |

OTHER PUBLICATIONS

European Search Report dated Aug. 29, 2018.

WIRELESS COMMUNICATION METHOD AND ELECTRONIC DEVICE FOR PROVIDING SAME

CLAIM OF PRIORITY

This application is a National Phase Entry of PCT International Application No. PCT/KR2016/012873, which was filed on Nov. 9, 2016, and claims a priority to Korean Patent Application No. 10-2015-0162372, which was filed on Nov. 19, 2015, the contents of which are incorporated herein by reference.

TECHNICAL FIELD

Various embodiments of the present disclosure relate to a wireless communication method and an electronic device supporting the same, and more particularly, to a method for performing a plurality of short-range wireless communications and an electronic device supporting the same.

BACKGROUND ART

Recently, with the development of technology, electronic devices capable of performing various functions have settled down as necessaries of the moderns. Such electronic devices have been changed to multimedia communication devices capable of providing not only inherent voice call services but also various kinds of data transmission services and various additional services.

As a multimedia communication device, an electronic device performs data transmission/reception with other electronic devices using various short-range communication methods. For example, the electronic device performs data transmission/reception with other electronic devices using technologies for the standards, such as wireless LAN (WLAN), BT, Zigbee, Z-Wave, ultra wide band (UWB), ultra-narrow band (UNB), wirelessUSB, wireless gigabit (WiGig), Bluetooth low energy (BLE), wirelessHD, TransferJet, and Wireless FireWire.

DISCLOSURE OF INVENTION

Technical Problem

Various standard technologies for short-range network communications, such as, Wi-Fi, BT, and NFC, may be installed in electronic devices. Users of the electronic devices may wirelessly use various kinds of services using such standard technologies. For example, users of the electronic devices may wirelessly use various kinds of services simultaneously using a plurality of Wi-Fi or BT technologies. In case where the electronic device uses the plurality of Wi-Fi or BT technologies, interference may occur between frequency bands.

Aspects of the present disclosure provide a wireless communication method capable of reducing the above-described problem through channel control of a wireless communication band and an electronic device supporting the same.

Solution to Problem

In one aspect of the present disclosure, a method in an electronic device supporting a first short-range wireless communication and a second short-range wireless communication includes connecting to a first external device on at least one channel of a band using the first short-range wireless communication; identifying a request for performing the second short-range wireless communication with a second external device while connecting to the first external device; and connecting the second external device to the first external device or an external communication server on the at least one channel of the band using the second short-range wireless communication in response to the request. Further, an electronic device supporting such a method is provided.

In another aspect of the present disclosure, a method in an electronic device supporting a first short-range wireless communication and a second short-range wireless communication includes establishing a first connection of a first external device to a second external device or an external communication server on at least one channel of a first band using the second short-range wireless communication; identifying a request for performing a second connection to the second external device using the first short-range wireless communication while the first external device is connected to the second external device or the external communication server; comparing a second band related to the second connection with the first band in response to the request; and changing the at least one channel used for the first connection based on a channel to be used for the second connection if the second band is equal to the first band. Further, an electronic device supporting such a method is provided.

Advantageous Effects of Invention

According to the aspects of the present disclosure, for example, in performing a plurality of short-range wireless communications using a communication module, it becomes possible to prevent a frequency interference phenomenon between the respective short-range wireless communications and an IP collision from occurring.

MODE FOR THE INVENTION

Figure 1:
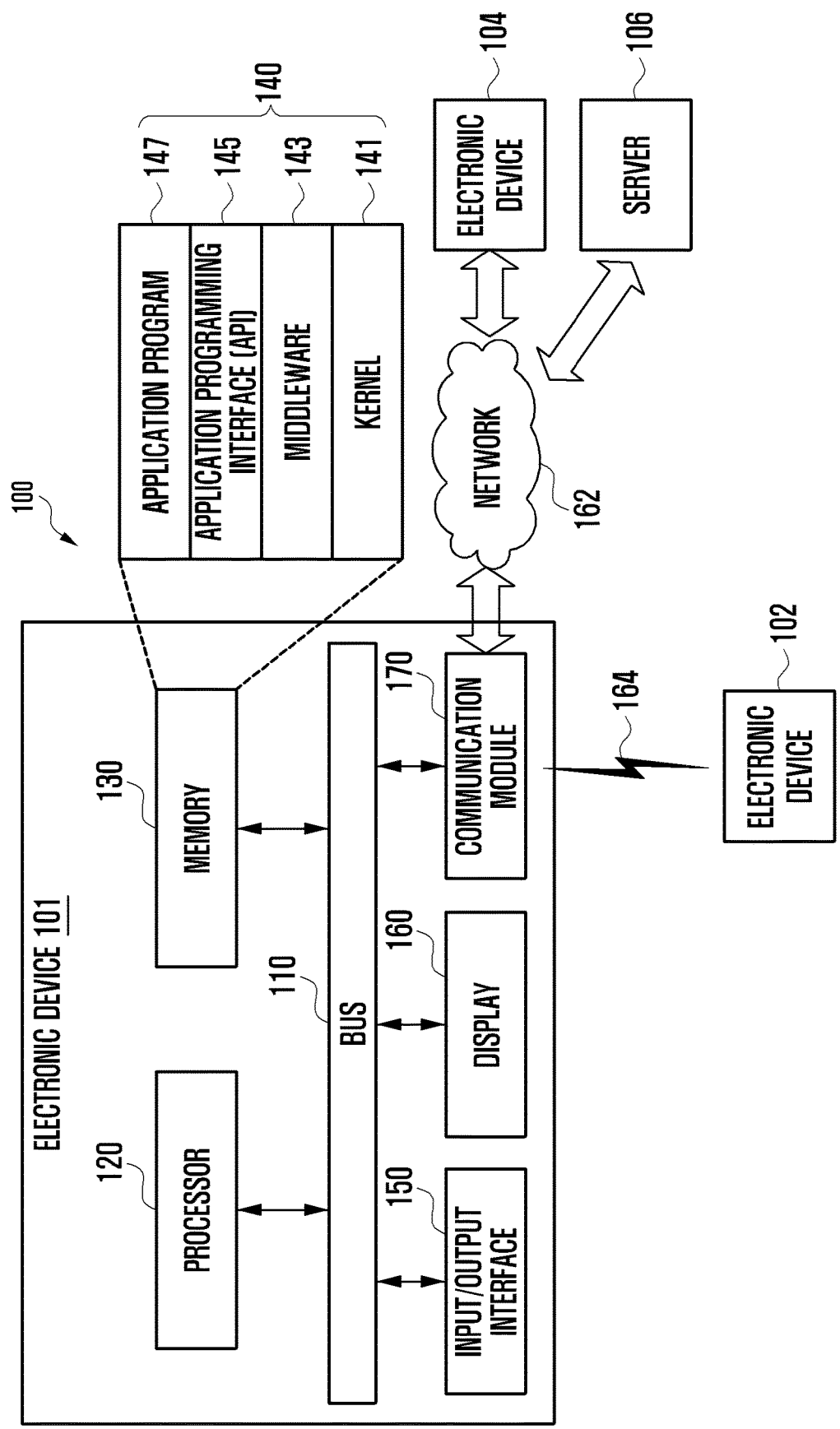
FIG. 1 is a block diagram of a network environment according to various embodiments of the present disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

The terms used in describing various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™) electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment 100 including an electronic device 101 according to various embodiments of the present disclosure. The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components.

The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The processor 120 according to an embodiment of the present disclosure may control a communication module 170 supporting a first short-range wireless communication and a second short-range wireless communication. The processor 120 may be functionally connected to the communication module 170. For example, the processor 120 may support a wireless fidelity (WiFi) using the first short-range wireless communication by accessing a radio access device (e.g., access point (AP)). Further, the processor 120 may support a second wireless LAN service (e.g., hotspot) using the second short-range wireless communication by configuring to provide the access unit (AP). The WiFi may mean a short-range communication capable of performing wireless Internet in a predetermined distance from a place where the access point (AP) is installed using radio waves or infrared transmission. The hotspot may mean a wireless LAN service area that is an area surrounding the access point (AP) where the communication is possible.

The processor 120 according to an embodiment of the present disclosure may connect to a first external device on at least one channel of a band using the first short-range wireless communication through the communication module 170, and may identify a request for performing the second short-range wireless communication with a second external device while connecting to the first external device. For example, the processor 120 may be connected to the WiFi using the first short-range wireless communication on a communication band channel of the first external device (e.g., access point (AP)). The processor may identify a signal for requesting the hotspot using the second short-range wireless communication among WiFi connections using the first short-range wireless communication. For example, the processor 120 may identify the request by a user's input for requesting performing of the second short-range wireless communication.

In case of using the wireless LAN service (e.g., hotspot) among the WiFi connections, the processor 120 according to an embodiment of the present disclosure may determine whether to use the same band based on whether to support a WiFi AP band and whether the electronic device 101 supports the WiFi band for another device. For example, the processor 120 may control to perform the communication using only 2.4 GHz band during the WiFi connection and the hotspot connection.

In response to the request, the processor 120 according to an embodiment of the present disclosure may control to connect the second external device to the first external device or an external communication server on the at least one channel of the band using the second short-range wireless communication.

If the channel of the band to be used during the second short-range wireless communication is pre-stored, the processor 120 according to an embodiment of the present disclosure may compare the pre-stored channel with the at least one channel used during the first short-range wireless communication. The processor 120 according to an embodiment of the present disclosure may adjust the channel of the band to be used during the second short-range wireless communication so that the channel coincides with the channel used during the first short-range wireless communication based on the result of the comparison. For example, the processor 120 may control the channel to be changed to the channel of the band that is equal to that of the WiFi in response to the signal for requesting the hotspot using the second short-range wireless communication among the WiFi connections using the first short-range wireless communication.

The processor 120 according to an embodiment of the present disclosure may configure the bands used for the first short-range wireless communication and the second short-range wireless communication to different bands. For example, if 2.4 GHz band is used for the first short-range wireless communication, the processor 120 may configure the band for the second short-range wireless communication to 5 GHz band.

The processor 120 may control other electronic devices to be connected to the first external device (e.g., WiFi AP) or the external communication server using the second short-range wireless communication through the channel of the changed band.

The processor 120 according to an embodiment of the present disclosure may compare IP band information allocated to the second external device with IP band information allocated to the first external device when controlling the second external device to be connected to the first external device or the external communication server.

A network on which the communication is performed may be divided into a public network and a virtual network. Here, the public network may be allocated with a public IP address, for example, an address of 100.100.100.100. The virtual network corresponds to a space in which the communication is performed in a predetermined area (e.g., communication area formed between the WiFi AP and a specific terminal), and may be allocated with a virtual IP address. For example, if access points (APs) for transmitting and receiving a plurality of short-range wireless communication (e.g., WiFi) signals exist for one terminal, the access points may be respectively allocated with IP addresses. As an additional example, the first access point may be allocated with an IP of 192.68.2.1, and the second access point may be allocated with an IP of 192.68.8.2.

The processor 120 according to an embodiment may identify a request for performing a wireless LAN service using the second short-range communication with second external devices (e.g., other terminal devices) while performing WiFi communication using the first short-range communication through the first external device (e.g., WiFi AP). For example, the processor may compare the IP band information allocated to the wireless LAN service (e.g., hotspot) of the second external device with the IP band information of 192.168.1.2 in response to the request from the second external devices (e.g., other terminal devices) while the IP band information of 192.168.1.2 is allocated to and is used for the first external device (e.g., WiFi AP).

The processor 120 may determine whether to reallocate the IP band information of the second external device based on the comparison result of the IP band information. For example, if the IP band information allocated for the wireless LAN service (e.g., hotspot) of the second external device is equal to the IP of 192.168.1.2 allocated to the first external device (e.g., WiFi AP), the processor 120 may control to change the IP band information. As an additional example, the processor 120 may output notification information about a change of IP allocation information.

The processor 120 according to an embodiment of the present disclosure may control the communication module 170 supporting the first short-range wireless communication and the second short-range wireless communication. For example, the processor 120 may control to support the wireless fidelity (WiFi) using the first short-range wireless communication and the wireless LAN service (e.g., hotspot) using the second short-range wireless communication.

The processor 120 according to an embodiment of the present disclosure may control to establish a first connection of a first external device to a second external device or an external communication server on at least one channel of a first band using the second short-range wireless communication. For example, the processor 120 may control to perform communication of the first external device (e.g., other terminal devices) based on the hotspot communication connection. Further, the processor 120 may control to connect the first external device (e.g., other terminal devices) to the external communication server (e.g., base station) based on the hotspot communication connection.

The processor 120 according to an embodiment of the present disclosure may identify a request signal for performing a second connection to the second external device using the first short-range wireless communication while the first external device is connected to the second external device or the external communication server. For example, the processor 120 may identify a request for performing a connection to the second external device (e.g., WiFi AP) for performing the wireless fidelity (WiFi) using the first short-range wireless communication while the first external device is connected to the network using the second short-range wireless communication for the wireless LAN service (e.g., hotspot). The request may be a signal generated by a user's input (e.g., touch input event).

The processor 120 according to an embodiment of the present disclosure may compare a second band related to the second connection with the first band in response to the request. For example, the processor 120 may compare the communication band of the wireless LAN service with the WiFi communication band in response to the WiFi connection request signal during using of the wireless LAN service (e.g., hotspot).

The processor 120 according to an embodiment of the present disclosure may change at least one channel used for the first connection based on a channel to be used for the second connection if the second band is equal to the first band. For example, if the channel of the communication band of the wireless LAN service (e.g., hotspot) is equal to the channel of the WiFi communication band, the processor 120 may change the channel used for the connection of the wireless LAN service (e.g., hotspot) based on the channel of the WiFi communication band.

If the second band is different from the first band, the processor 120 according to an embodiment of the present disclosure may control to perform the communication without changing the at least one channel used for the first connection. For example, if the communication band of the wireless LAN service (e.g., hotspot) is different from the WiFi communication band, the processor 120 may control to perform the communication without changing the channel used for the connection of the wireless LAN service (e.g., hotspot).

If the second band is equal to the first band, the processor 120 according to an embodiment of the present disclosure may control a display module 160 to display on a screen a notification item including information about a temporary communication disconnection possibility of the first connection when changing the at least one channel used for the first connection based on a channel to be used for the second connection. The processor 120 according to an embodiment may control the communication module 170 not to perform the communication with other external devices until the at least one channel used for the first connection is changed to coincide with the channel to be used for the second connection. The processor 120 according to an embodiment may control the display module 160 to display on the screen a change item including information for requesting a channel change of the first band.

The processor 120 according to an embodiment of the present disclosure may identify a communication performance request signal for a third external device to replace the second external device and a wireless communication band for performing communication with the third external device while the first connection and the second connection are established. For example, the processor 120 may identify the communication performance request for another WiFi AP to replace the second external device (e.g., WiFi AP) while the connection using the wireless LAN service (e.g., hotspot) and the WiFi connection through the second external device (e.g., WiFi AP) are established. The processor 120 may identify the wireless communication band of another WiFi AP while performing the connection to another identified WiFi AP. As an additional example, the request may be a signal that is generated when the processor enters into an area where the wireless communication of the third external device (e.g., WiFi AP) is possible, or a signal that is generated by an input event for user's function performance.

If the wireless communication band of the third external device is different from the first band, the processor 120 according to an embodiment of the present disclosure may establish a third connection as a wireless communication band of the third external device to replace the second connection. If the identified communication band of another WiFi AP is different from the communication band using the wireless LAN service (e.g., hotspot), the processor 120 may newly establish a connection for transmission/reception of the WiFi signal with another WiFi AP.

If the wireless communication band of the third external device is equal to the first band, but channels of the respective bands are different from each other, the processor 120 may determine whether a protocol capable of changing the channel of the first band to the channel of the wireless communication band of the third external device while maintaining the first connection can be performed. If the wireless communication band of another WiFi AP to be newly connected is equal to the communication band for performing the wireless LAN service (e.g., hotspot), the processor 120 according to an embodiment may determine whether the channels of the respective bands are equal to each other through comparison.

If the channels of the respective bands are different from each other, the processor 120 may determine whether the protocol capable of changing the channel to the channel of the wireless communication band of another WiFi AP while maintaining the connection using the wireless LAN service (e.g., hotspot) can be performed. If the protocol capable of changing the channel to the channel of the wireless communication band of another WiFi AP can be performed, the processor 120 may change the channel for a client device using the wireless LAN service (e.g., hotspot).

For example, the processor 120 may control to change the communication band channel without disconnection from the first external device (e.g., other terminals) using a 11v BSSTRANS protocol and a BSSTRANS message. Here, the 11v BSSTRANS protocol and the BSSTRANS message may be rules included in any one of the communication standards IEEE 802.11 a/b/g/n/ac.

If it is determined that the protocol capable of changing the channel to the channel of the wireless communication band of another WiFi AP while maintaining the connection using the wireless LAN service (e.g., hotspot) cannot be performed, the processor 120 may change the communication band channel for the wireless LAN service (e.g., hotspot). The processor 120 may reestablish the wireless LAN service (e.g., hotspot) of client devices on the changed channel.

The processor 120 according to an embodiment of the present disclosure may disconnect the existing first connection (e.g., connection to another terminal device through hotspot communication) and may reestablish the first connection on the same communication band channel as that of the third external device (e.g., WiFi AP) in response to the communication performance request signal for the third external device (e.g., WiFi AP).

The processor 120 according to an embodiment of the present disclosure may discontinue the connection to another WiFi AP for a predetermined time in response to the communication performance request signal for the third external device (e.g., WiFi AP). The processor 120 according to an embodiment may control the communication module 170 to transmit a request signal for changing the channel to the communication band channel for the third external device (e.g., WiFi AP) to the first external device (e.g., other terminal devices).

The processor 120 according to an embodiment of the present disclosure may change the channel of the first band based on the result of the determination, and may establish the third connection by replacing the second connection based on the result of the channel change.

The processor 120 according to an embodiment of the present disclosure may identify the communication performance request signal for a plurality of external devices to replace the second external device while the first connection and the second connection are established. For example, the processor 120 may identify the communication performance request signal for other WiFi APs to replace the WiFi AP while the communication connection of other terminals through the hotspot function and the connection through the WiFi are established. As an additional example, the request signal may be a signal that is generated in an area where the wireless communication of the plurality of external devices is possible, or a signal that is generated by a user's input.

The processor 120 according to an embodiment of the present disclosure may identify pre-stored communication bands of the plurality of external devices and channel information of the communication bands in response to the identified communication performance request signal. The processor 120 according to an embodiment of the present disclosure may determine one of the plurality of external devices as a device to replace the second external device based on the identified communication band information and channel information. For example, the processor 120 may determine one of the plurality of external devices as a device to replace the second external device if the pre-stored communication bands of the plurality of external devices are different from the communication band of the first external device supporting the wireless LAN service (e.g., hotspot) or the communication bands and the channels of the communication bands coincide with each other.

For example, in a memory 130, channel information on the plurality of external devices, channel band information, basic service set identification (BSSID)/media access control (MAC) addresses, physical layer (PHY) mode information, signal information, noise information, signal to noise ratio (S/N) information, subsystem identification (SSID) information, and received signal strength indication (RSSI) value information may be pre-stored. If entering into wireless WiFi areas of other external devices, the processor 120 may control to connect to any one of other external devices based on at least one piece of stored information.

The processor 120 according to an embodiment of the present disclosure may establish the third connection by replacing the determined device and the second connection. For example, the processor 120 may determine the third external device (e.g., WiFi AP) determined as an AP to replace the second external device (e.g., WiFi AP).

If the communication with the second external device is interrupted while the first connection and the second connection are established, the processor 120 according to an embodiment of the present disclosure may control to perform communication using another wireless communication method. For example, if the communication with the second external device is interrupted during the WiFi connection through the second external device (e.g., WiFi AP), the processor 120 may control to perform the communication of the first external device (e.g., other terminals) using another wireless communication method (e.g., long term evolution (LTE)).

The processor 120 according to an embodiment of the present disclosure may compare IP band information allocated to the first external device with IP band information allocated to the second external device in response to the request signal. The processor 120 may determine whether to reallocate the IP band information of the first external device based on the comparison result of the IP band information. For example, if the IP band information allocated for the communication performance of the first external device (e.g., other terminals) is 192.168.3.2, the processor 120 may determine whether the IP band information allocated for the communication performance of the second external device (e.g., WiFi AP) coincides with that of the first external device. For example, if the IP band information allocated for the communication performance of the second external device (e.g., WiFi AP) is equal to 192.168.3.2, the processor 120 may change the IP band allocation information of the first external device. If the IP band information allocated for the communication performance of the second external device (e.g., WiFi AP) is different from 192.168.3.2, the processor 120 may perform the WiFi communication of the second external device using the corresponding IP.

In case of determining an external device to perform the communication connection among a plurality of external devices, the processor 120 according to an embodiment of the present disclosure may determine the external device to perform the communication based on at least one of connection frequency information, IP allocation information of the first external device, and IP history allocation information of the second external device.

A channel according to an embodiment of the present disclosure may include at least one of communication band frequency related data and Internet protocol (IP) band related data.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
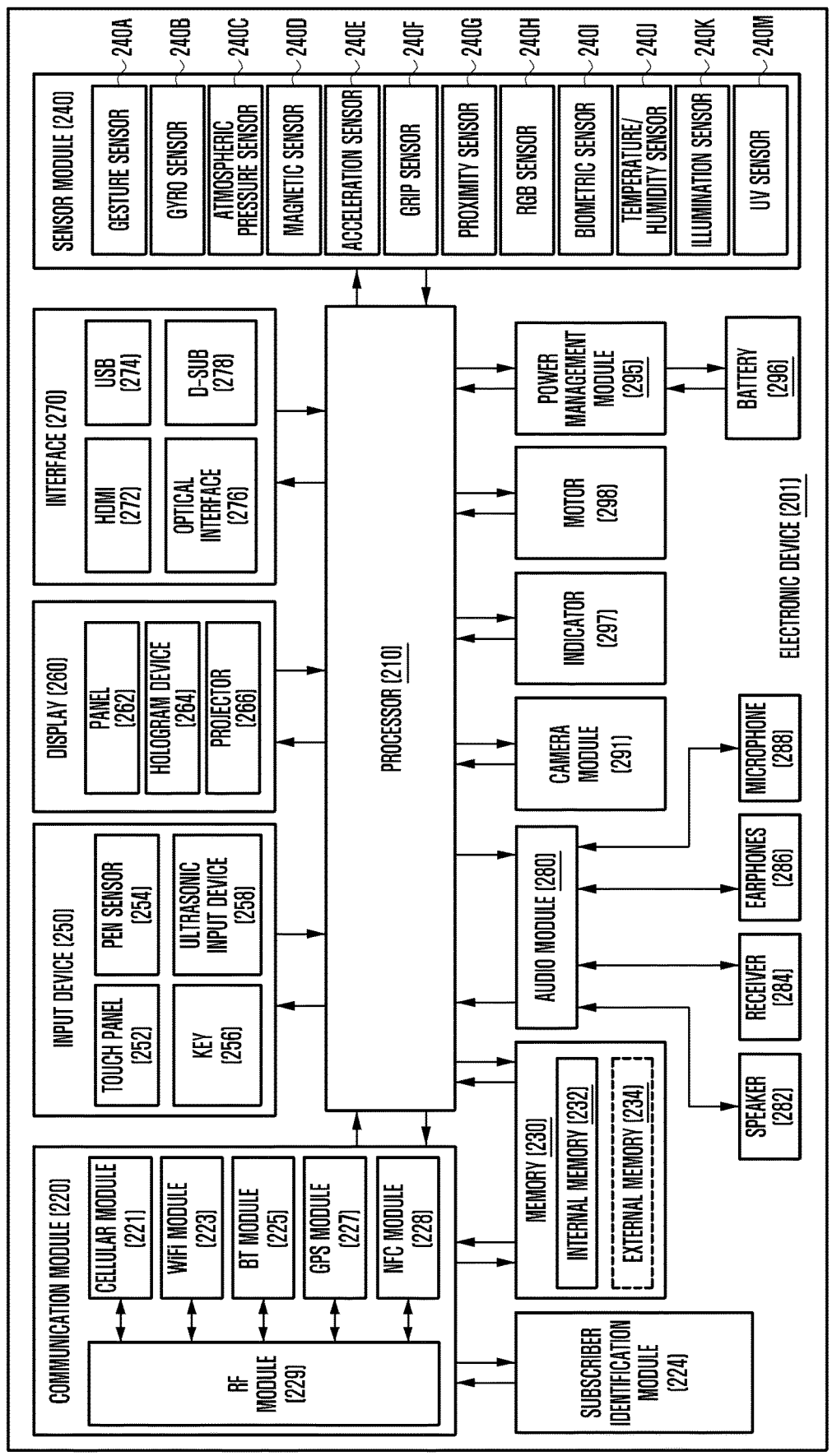
FIG. 2 is a block diagram of an electronic device according to various embodiments of the present disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 1721 is also capable of including a communication processor (CP).

Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
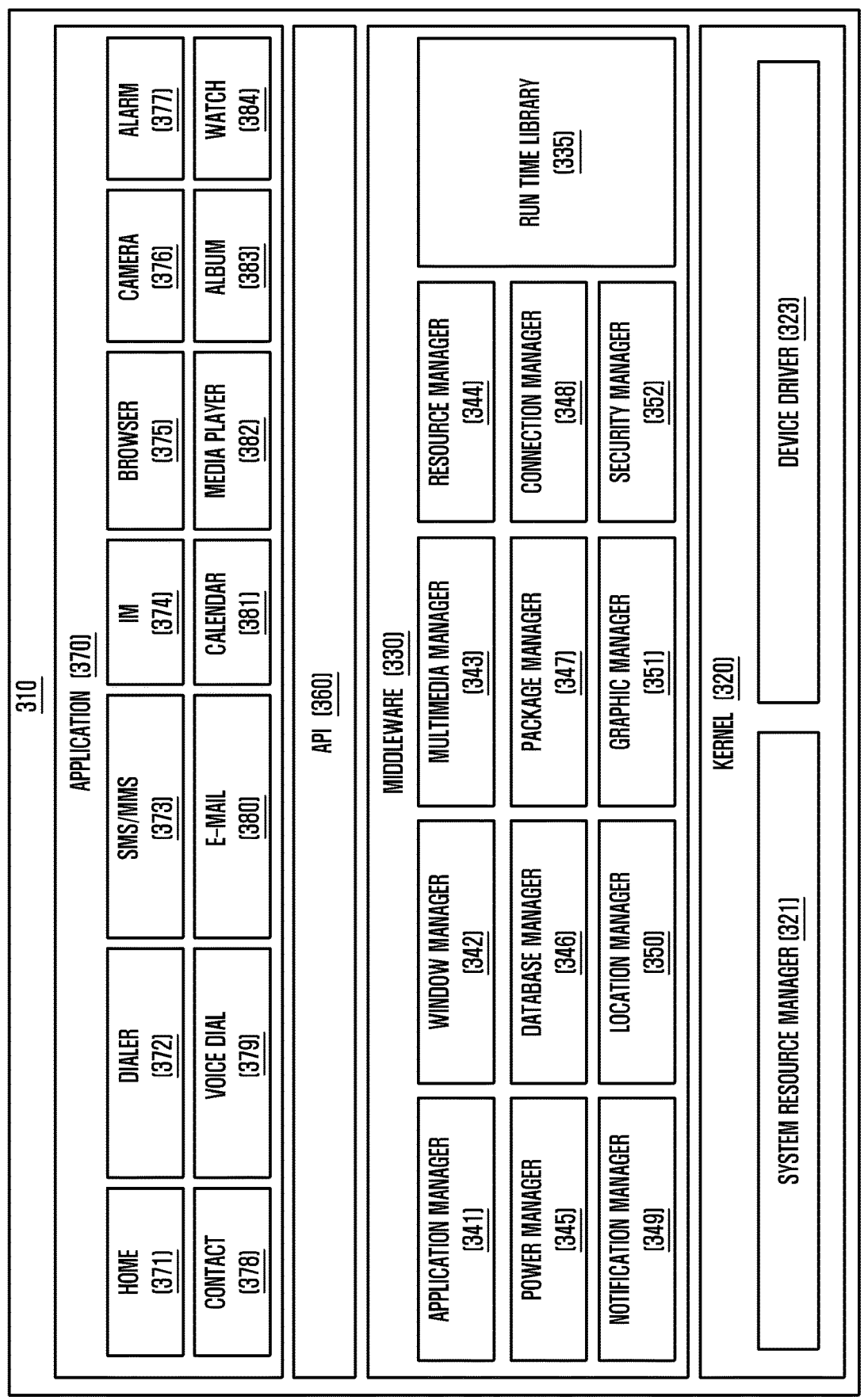
FIG. 3 is a block diagram of a program module according to various embodiments of the present disclosure.

FIG. 3 is a block diagram of a programming module according to various embodiments. According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc.

The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 may include modules, programs, routines, sets of instructions or processes, etc., in order to perform one or more functions.

Figure 4:
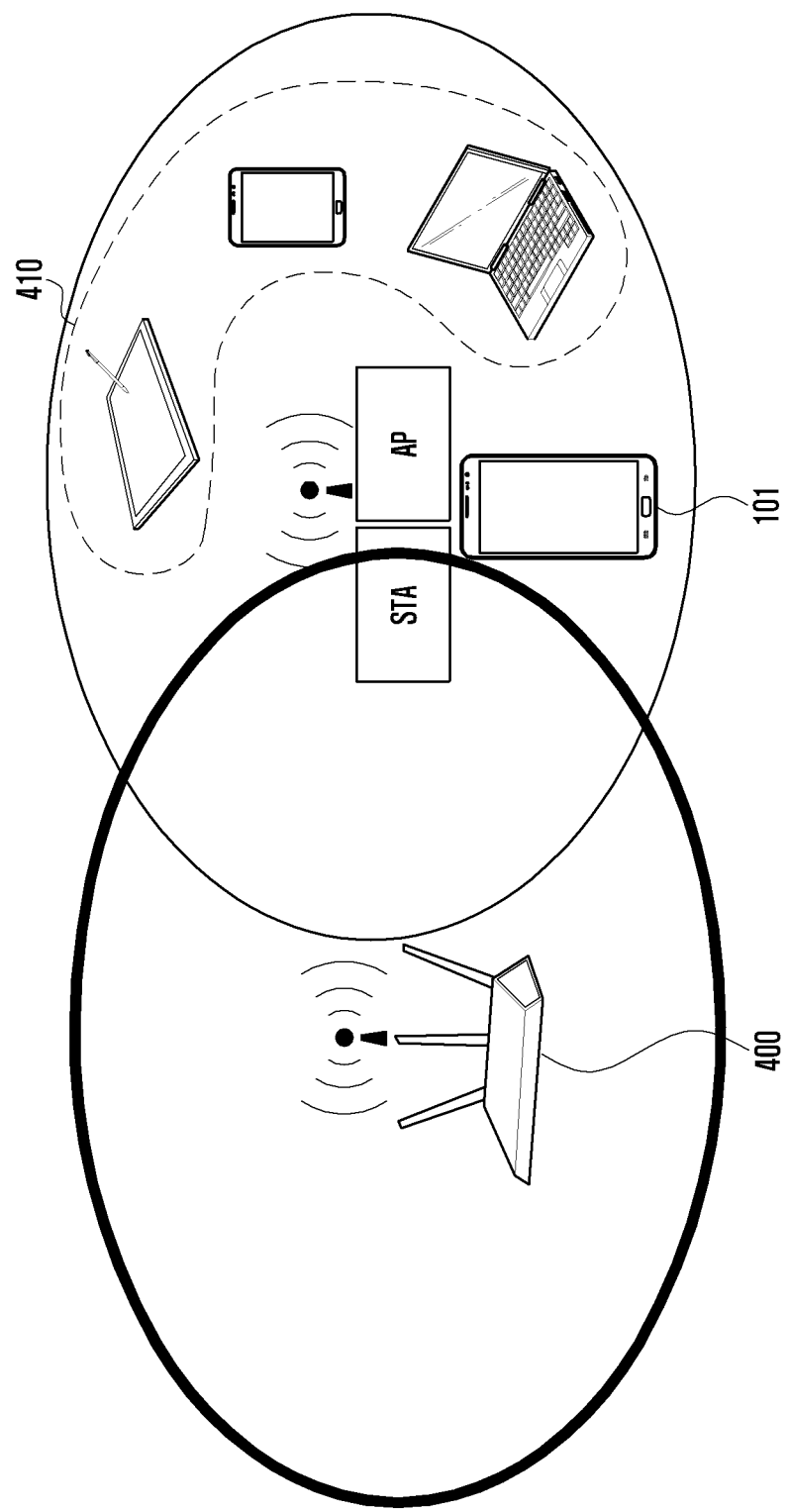
FIG. 4 is a diagram illustrating a communication connection of an electronic device to a first external device and a plurality of external devices according to various embodiments of the present disclosure.

FIG. 4 is a diagram illustrating a communication connection of an electronic device 101 to a first external device 400 and a plurality of external devices 410 according to various embodiments of the present disclosure.

An electronic device 101 according to an embodiment of the present disclosure may transmit/receive a communication signal to/from a first external device (e.g., access point (AP)) 400. For example, the electronic device 101 may operate in a basic WiFi transmission/reception mode, and may receive a short-range wireless communication (e.g., wireless fidelity (WiFi)) signal from the first external device 400. The WiFi transmission/reception mode may be a mode in which the electronic device 101 attempts to connect to a neighboring WiFi AP of the electronic device 101 if a user input for requesting transmission/reception of the WiFi signal to/from the WiFi AP is made.

The electronic device 101 according to an embodiment of the present disclosure may control to connect communications for a plurality of external devices 410 through the WiFi signal received from the first external device 400. The electronic device 101 according to an embodiment may control tethering of the plurality of external devices 410 based on the WiFi signal received from the first external device 400. The tethering may be an Internet sharing method making the Internet usage possible by connecting a device, such as a terminal capable of using the Internet, to other external devices.

The electronic device 101 according to an embodiment of the present disclosure may control to perform communication connection with the plurality of external devices 410 through a mobile hotspot (MHS) operation using the WiFi signal received from the first external device 400. The hotspot operation may be an operation for a mobile terminal to operate as an AP and to make a neighboring terminal communicable in a short distance.

The electronic device 101 according to an embodiment of the present disclosure may support dual WiFi that enables two bands (e.g., 5 GHz and 2.4 GHz) to be used. The dual WiFi may be a technology whereby the electronic device 101 can use two bands that are divided into a WiFi framework and a WiFi/MHS framework to support respective communications for performing separate operations. For example, the electronic device 101 may perform WiFi communication with the first external device using the 5 GHz band and may perform hotspot operation with a plurality of external devices 410 using the 2.4 GHz band.

Figure 5:
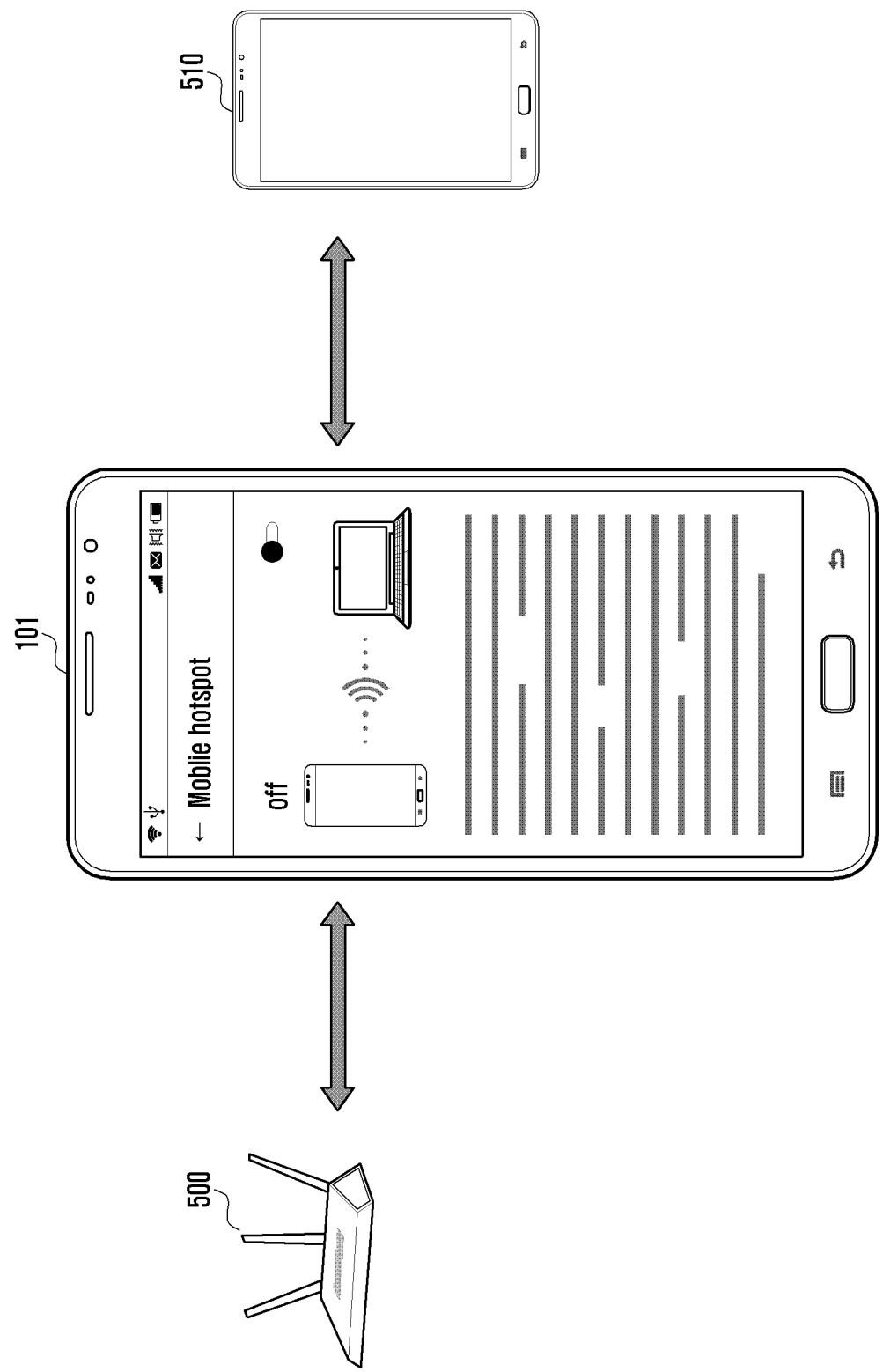
FIG. 5 is a diagram illustrating a connection of an electronic device to a second external device while the electronic device is connected to a first external device according to various embodiments of the present disclosure.

FIG. 5 is a diagram illustrating a connection of an electronic device 101 to a second external device 510 while the electronic device is connected to a first external device 500 according to various embodiments of the present disclosure.

An electronic device 101 according to an embodiment of the present disclosure may transmit/receive a communication signal to/from a first external device (e.g., access point (AP)) 500. The electronic device 101 according to an embodiment may perform a network operation through reception of a WiFi signal from the first external device 500.

The electronic device 101 according to an embodiment of the present disclosure may identify a request signal for mobile hotspot (MHS) connection with another external device 510 while connecting to the first external device 500.

The electronic device according to an embodiment of the present disclosure may compare a communication band of the first external device 500 with a communication band of the other external device 510 in response to the request signal. If the communication band of the first external device 500 is different from the communication band of the other external device 510, the electronic device 101 according to an embodiment may perform mobile hotspot connection with the other external device 510. If the mobile hotspot is connected, the other external device 510 may perform network connection using the WiFi signal of the first external device 500 or using a communication signal from an external communication server (e.g., base station).

If the communication band of the first external device 500 coincides with the communication band of the other external device 510, the electronic device 101 according to an embodiment may compare the communication band channel for the first external device 500 with the communication band channel for the external device 510. If the respective channels coincide with each other, the electronic device 101 according to an embodiment may perform the mobile hotspot connection with the other external device 510. If the respective channels do not coincide with each other, the electronic device 101 according to an embodiment may control to change the mobile hotspot channel for the other external device 510 to the communication band channel for the first external device 500. The electronic device may perform the mobile hotspot connection with the other external device 510 on the changed communication band channel.

The electronic device 101 according to an embodiment may configure the communication band of the other external device based on the communication band for communication with the first external device 500. For example, if the communication band used for the first external device 500 is 2.4 GHz, the electronic device may configure the communication band for connection to the other external device to 5 GHz.

If a request for performing communication with the other external device is input while the electronic device 101 according to an embodiment communicates with the first external device 500, the electronic device 101 may perform the communication with the other external device without cancelling the connection to the first external device 500.

Figure 6:
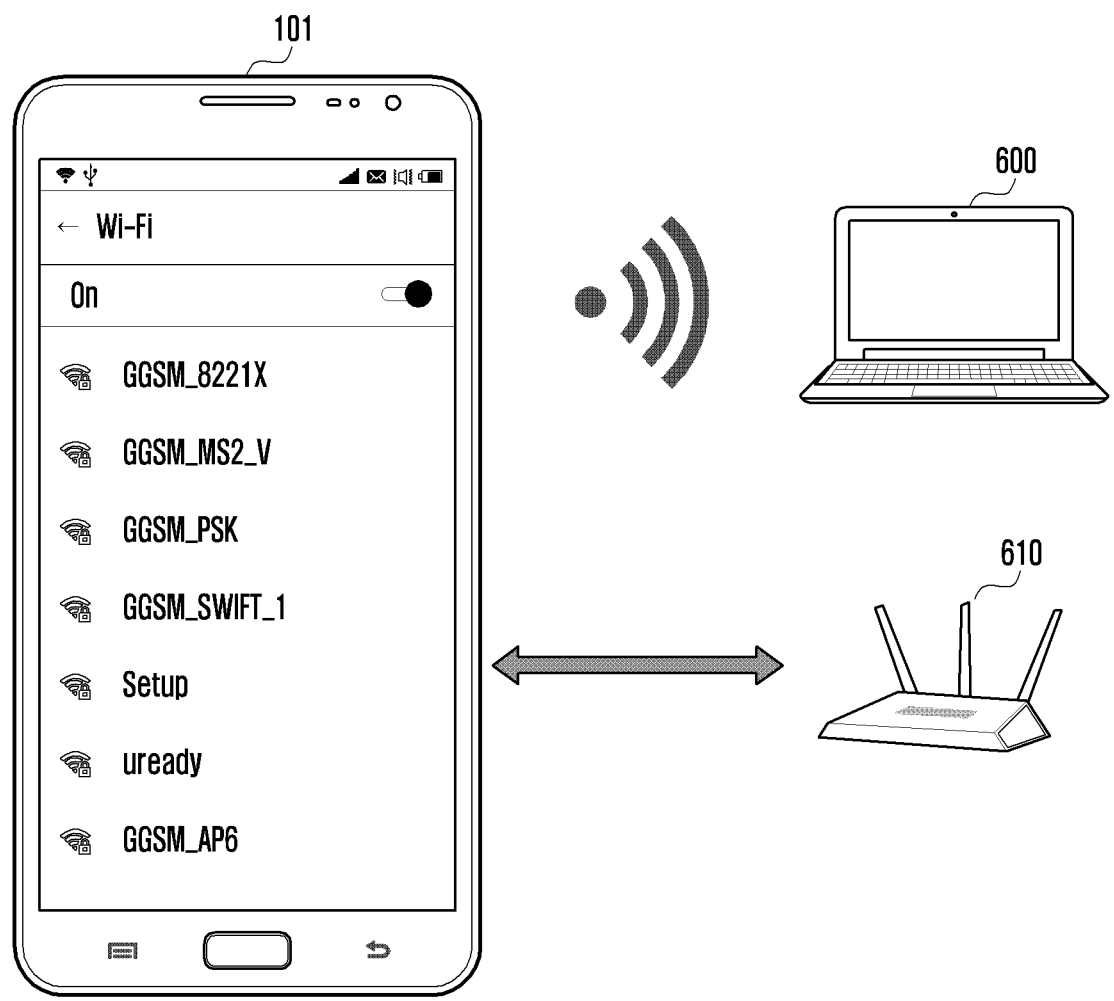
FIG. 6 is a diagram illustrating a connection of an electronic device to a second external device while the electronic device is connected to a first external device according to various embodiments of the present disclosure.

FIG. 6 is a diagram illustrating a connection of an electronic device 101 to a second external device 610 while the electronic device is connected to a first external device 600 according to various embodiments of the present disclosure.

An electronic device 101 according to an embodiment of the present disclosure may identify a request from another external device 610 during a mobile hotspot (MHS) connection to a first external device 600. For example, the electronic device 101 may enter into an area where a WiFi access point (AP) can be accessed while the electronic device 101 and the first external device 600 are in a mobile hotspot connection state.

The electronic device 101 according to an embodiment may change its function to perform hotspot function through an access to another external device 610 if the electronic device 101 enters into an area where WiFi wireless network connection of the other external device 610 is possible while the electronic device 101 and the first external device 600 are in a hotspot connection state using one communication standard (e.g., long term evolution (LTE)).

The electronic device 101 according to an embodiment of the present disclosure may identify the WiFi communication band and channel after WiFi connection to the other external device 610. The electronic device 101 according to an embodiment may compare the identified WiFi communication band and channel with the communication band and channel on which the mobile hotspot connection to the first external device 600 has been made. For example, if the respective communication bands are different from each other, the electronic device 101 may provide the communication using the mobile hotspot with the first external device 600 through the respective communication bands, and may perform the WiFi communication with the second external device 610.

If the identified WiFi communication band coincides with the communication band on which the mobile hotspot of the first external device 600 is performed, the electronic device according to an embodiment of the present disclosure may compare channels of the respective communication bands with each other. If the channels of the respective communication bands coincide with each other, the electronic device 101 according to an embodiment may control to perform the respective communications on the channels of the same communication band. If the channels of the respective communication bands do not coincide with each other, the electronic device 101 according to an embodiment may change the channel of the communication band on which the mobile hotspot of the first external device 600 is performed to coincide with the channel of the identified WiFi communication band.

If the channel of the communication band on which the mobile hotspot is performed is changed, the electronic device 101 according to an embodiment of the present disclosure may display on the screen of the electronic device 101 notification information notifying that the communication with the first external device 600 may be temporarily cut off, or may be in a standby state without attempting an access to separate devices (e.g., access point (AP)). If the channel of the communication band on which the mobile hotspot is performed is pre-stored or fixed, the electronic device 101 according to an embodiment may display on the screen an image item for requesting the channel change of the communication band.

Figure 7:
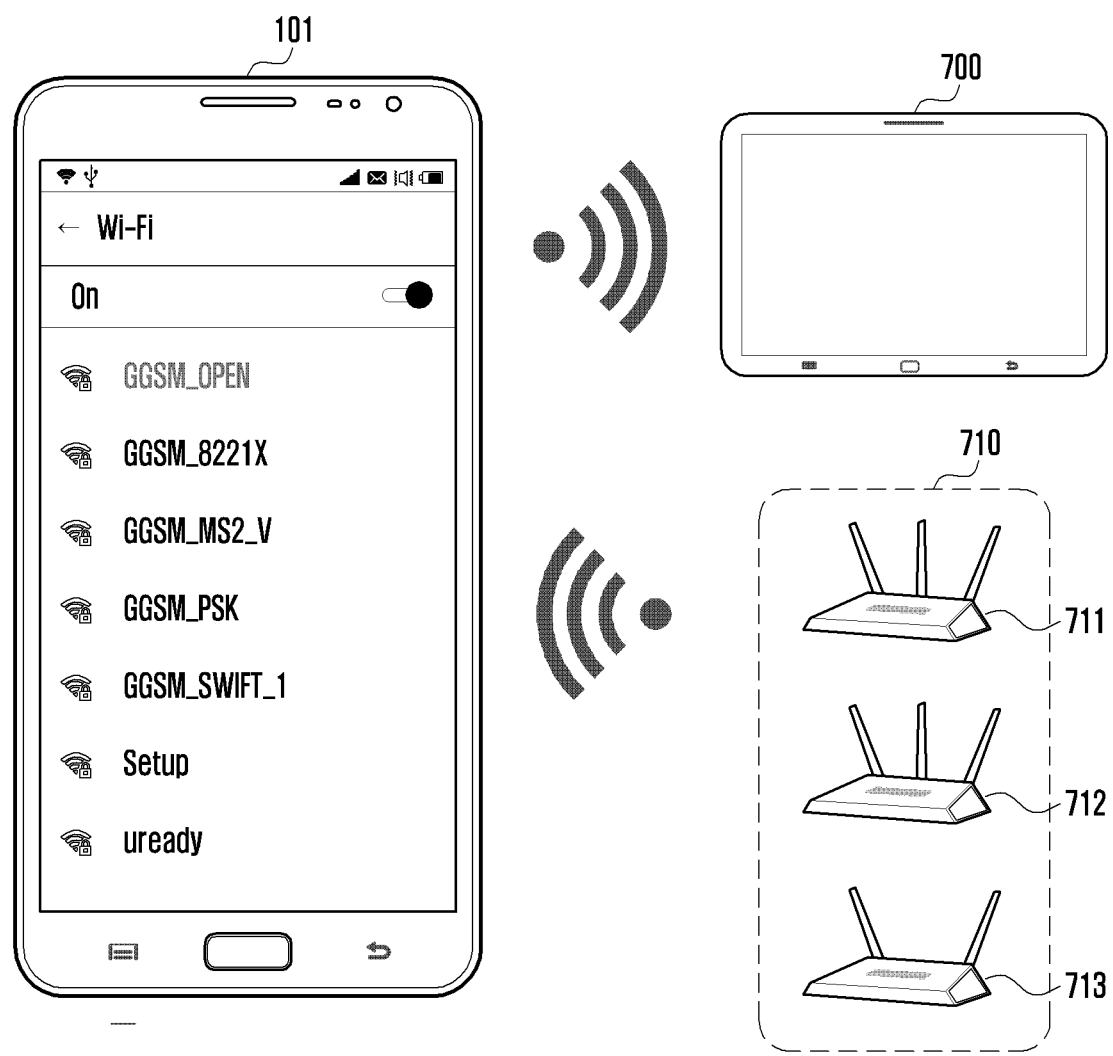
FIG. 7 is a diagram illustrating a connection of an electronic device to other external devices while the electronic device is connected to a first external device and a second external device according to various embodiments of the present disclosure.

FIG. 7 is a diagram illustrating a connection of an electronic device 101 to other external devices 712 and 713 while the electronic device 101 is connected to a first external device 700 and a second external device 711 according to various embodiments of the present disclosure.

An electronic device 101 according to an embodiment of the present disclosure may perform mobile hotspot connection to a first external device 700, and may perform WiFi connection to a second external device 711. For example, the electronic device 101 may control to perform the connections in a state where the communication bands of the mobile hotspot performed with the first external device 700 and the second external device and the channels of the respective communication bands respectively coincide with each other.

The electronic device 101 according to an embodiment of the present disclosure may move to enter into wireless WiFi areas of other external devices 712 and 713. For example, the electronic device 101 may enter into the wireless WiFi area of the second external device 712 of other external devices 712 and 713. If entering into the wireless WiFi area of the second external device 712, the electronic device 101 according to an embodiment may control to disconnect the existing WiFi connection to the second external device 711 and to perform WiFi connection to the third external device 712.

If entering into the wireless WiFi area of the third external device 712, the electronic device 101 according to an embodiment of the present disclosure may control not to attempt a connection to another external device 713 for a predetermined time.

If entering into the wireless WiFi area of the third external device 712 while performing WiFi connection to the second external device 711, the electronic device 101 according to an embodiment of the present disclosure may determine whether the wireless WiFi band of the third external device 712 coincides with the communication band on which the mobile hotspot function with the first external device 700 is performed. If the wireless WiFi band of the third external device 712 does not coincide with the communication band on which the mobile hotspot function with the first external device 700 is performed, the electronic device 101 according to an embodiment may perform the WiFi communication through the communication band of the third external device 712.

If the wireless WiFi band of the third external device 712 coincides with the communication band on which the mobile hotspot function with the first external device 700 is performed, the electronic device 101 according to an embodiment of the present disclosure may determine whether the channel of the wireless WiFi band of the third external device 712 coincides with the channel of the communication band of the first external device 700. If the channel of the wireless WiFi band of the third external device 712 coincides with the channel of the communication band of the first external device 700, the electronic device 101 according to an embodiment may perform the WiFi communication through the channel of the communication band of the third external device 712.

If entering into the wireless WiFi area of the third external device 712 while performing the WiFi connection to the second external device 711, the electronic device 101 according to an embodiment of the present disclosure may have a search process to find a connectable wireless WiFi. In this case, the frequency searching band may be divided into a plurality of groups to perform the search process. For example, the frequency searching band may be divided into a plurality of areas in a manner that 1 to 10 channels of 2.4 GHz are grouped into group A, 11 to 14 channels thereof are grouped into group B, and 36 to 64 channels of 5 GHz are grouped into group C, and according to circumstances, the selected group may be first searched for. If a proper external device (WiFi AP) for the connection is found during the search operation, a search for the remaining groups may not be performed. In this case, the group division may be performed in consideration of the channel connected to the existing mobile hotspot. Through this, a new frequency may be searched for during the connection to the existing external device (MHS).

If the channel of the wireless WiFi band of the third external device 712 does not coincide with the channel of the communication band of the first external device 700, the electronic device 101 according to an embodiment of the present disclosure may identify whether it is possible to change the channel of the communication band without disconnection from the first external device 700 connected by the mobile hotspot. For example, the electronic device 101 may control to change the channel of the communication band without disconnection from the first external device 700 using a 11v BSSTRANS protocol and a BSSTRANS message. Here, the 11v BSSTRANS protocol and the BSSTRANS message may be rules included in any one of the communication standards IEEE 802.11 a/b/g/n/ac.

If a protocol capable of changing the channel of the communication band without disconnection from the first external device 700 does not exist, the electronic device 101 according to an embodiment of the present disclosure may control to change the communication band channel of the mobile hotspot of the first external device 700. The electronic device 101 may reestablish the connection to the first external device 700 through the changed communication band channel of the mobile hotspot of the first external device 700.

Figure 8:
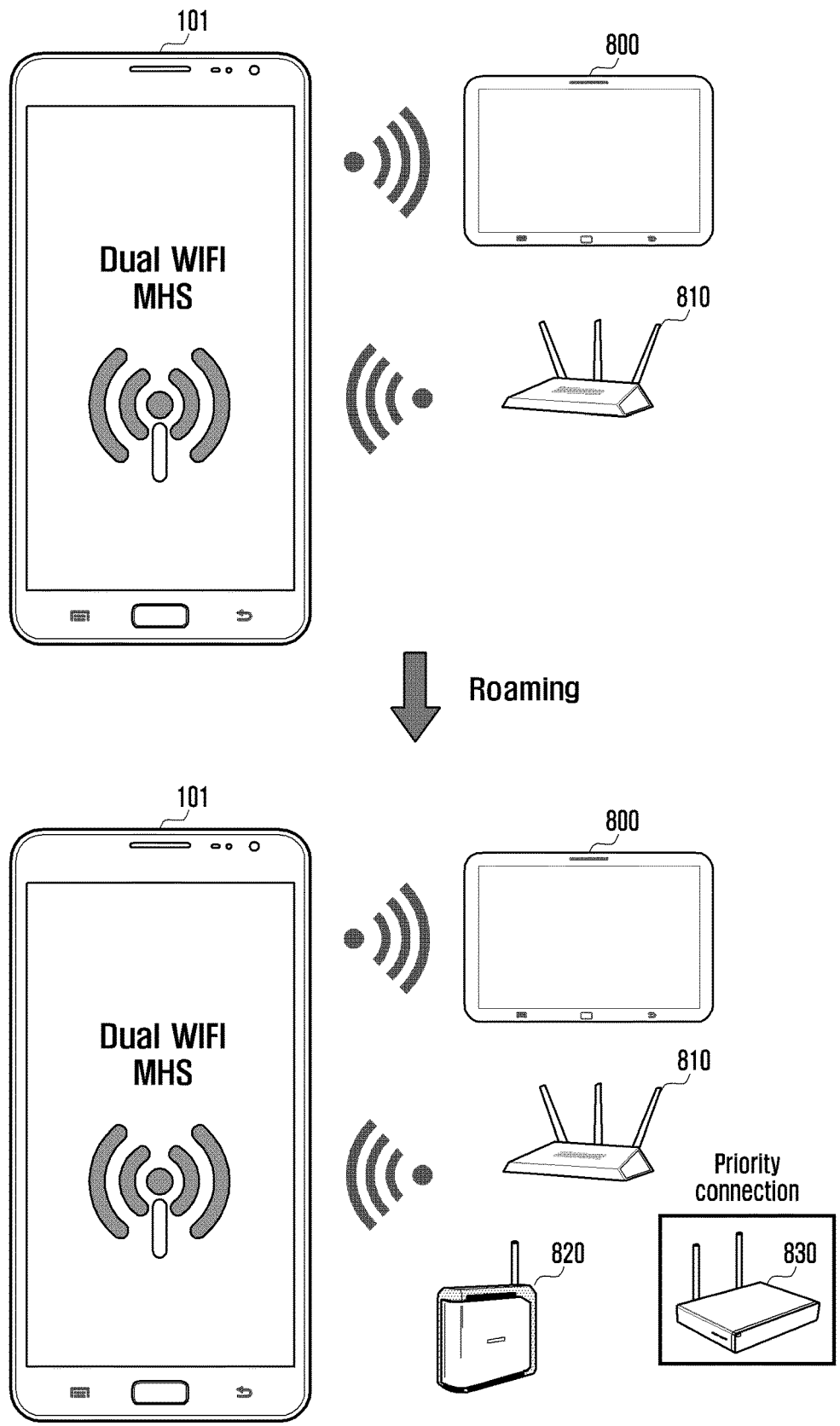
FIG. 8 is a diagram illustrating a connection of an electronic device to other external devices while the electronic device is connected to a first external device and a second external device according to various embodiments of the present disclosure.

FIG. 8 is a diagram illustrating a connection of an electronic device 101 to other external devices 820 and 830 while the electronic device 101 is connected to a first external device 800 and a second external device 810 according to various embodiments of the present disclosure.

An electronic device 101 according to an embodiment of the present disclosure may perform mobile hotspot connection to a first external device 800, and may perform WiFi connection to a second external device 810.

The electronic device 101 according to an embodiment of the present disclosure may move to enter into wireless WiFi areas of other external devices 820 and 830. The electronic device 101 according to an embodiment may pre-store therein channel information on the plurality of external devices 810, channel band information, basic service set identification (BSSID)/media access control (MAC) addresses, physical layer (PHY) mode information, signal information, noise information, signal to noise ratio (S/N) information, subsystem identification (SSID) information, and received signal strength indication (RSSI) value information.

If entering into the wireless WiFi areas of other external devices 820 and 830, the electronic device 101 according to an embodiment of the present disclosure may control to connect to any one of other external devices 820 and 830 based on at least one piece of the stored information. For example, the electronic device 101 may preferentially select the fourth external device 830 using only WiFi strength of other external devices 820 and 830, may preferentially select the fourth external device 830 that uses the same band channel as that of the first external device 800, or may preferentially select the fourth external device 830 based on the received signal strength value information.

Figure 9:
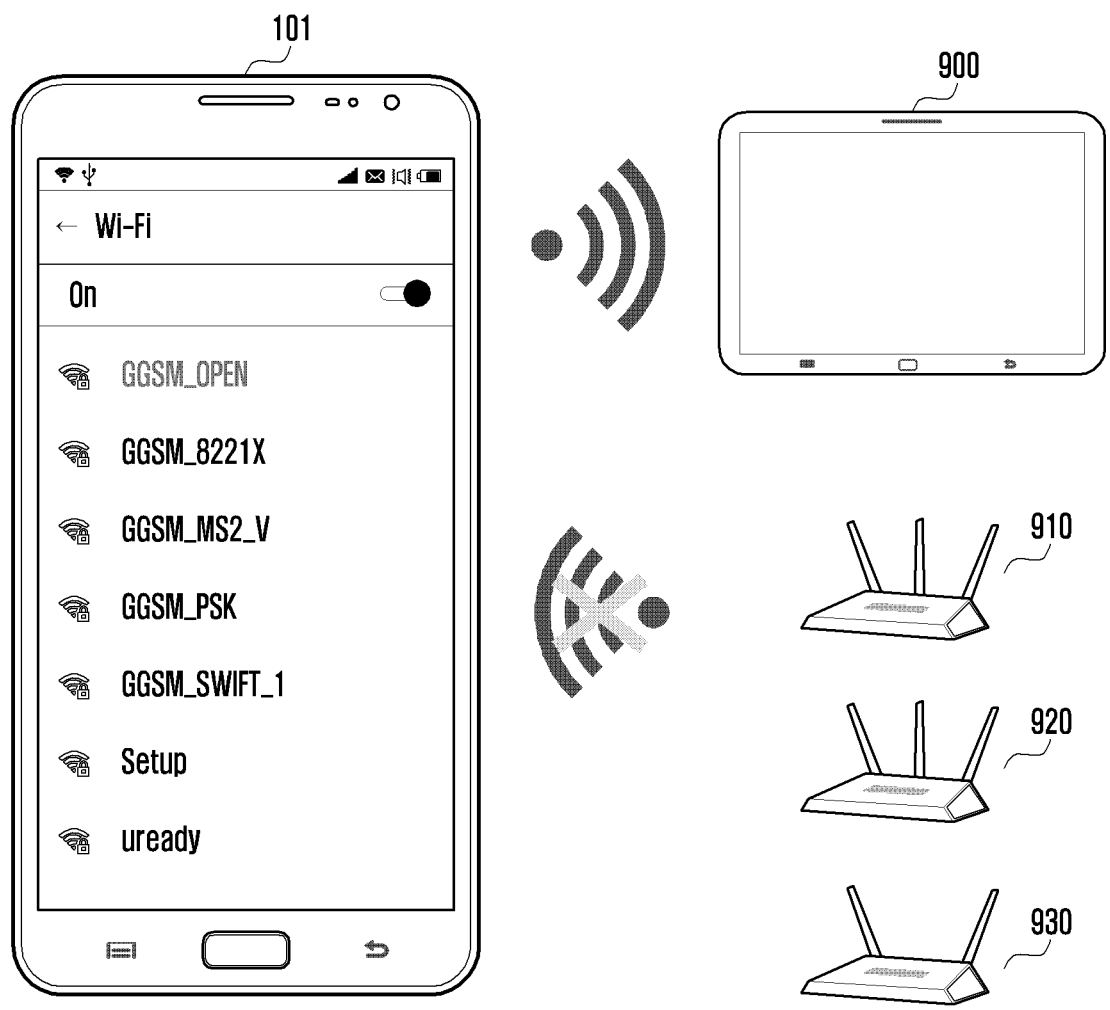
FIG. 9 is a diagram illustrating a disconnection of an electronic device from a second external device while the electronic device is connected to a first external device and the second external device according to various embodiments of the present disclosure.

FIG. 9 is a diagram illustrating a disconnection of an electronic device 101 from a second external device 910 while the electronic device 101 is connected to a first external device 900 and the second external device 910 according to various embodiments of the present disclosure.

An electronic device 101 according to an embodiment of the present disclosure may perform mobile hotspot connection to a first external device 900, and may perform WiFi connection to a second external device 7910. For example, the electronic device 101 may control to connect the first external device 900 to the second external device 910 or to an external communication server (e.g., base station) through a WiFi signal received from the second external device 910.

The electronic device 101 according to an embodiment of the present disclosure may be disconnected from the second external device 910 while it is connected to the first external device 900 and the second external device 910. If the electronic device 101 according to an embodiment is disconnected from the second external device 910 while performing mobile hotspot function of the first external device 900 through the WiFi signal of the second external device 910, it may control to perform network connection using a separate network means. For example, the electronic device 101 may support the communication of the first external device 900 through a long term evolution (LTE) network through the external communication server (e.g., base station).

As an additional example, if the electronic device 101 is disconnected from the second external device 910, it may identify whether it is possible to receive the WiFi signal from other external devices 920 and 930. The electronic device 101 may determine any one of other external devices 920 and 930 based on a pre-stored WiFi received signal strength or the like, and may perform the WiFi communication. The electronic device 101 may support to resume hotspot function performing with the first external device 900 based on the determined external device.

Figure 10:
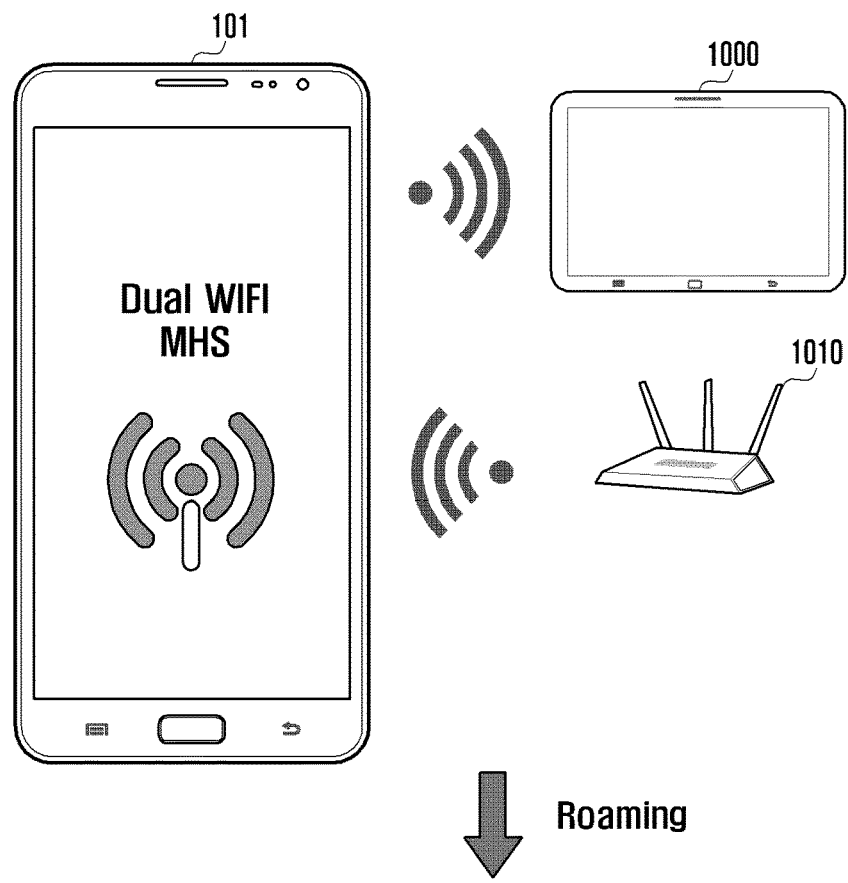
FIG. 10 is a diagram illustrating an IP allocation of an electronic device to a third external device while the electronic device is connected to a first external device and a second external device according to various embodiments of the present disclosure.
Figure 10:
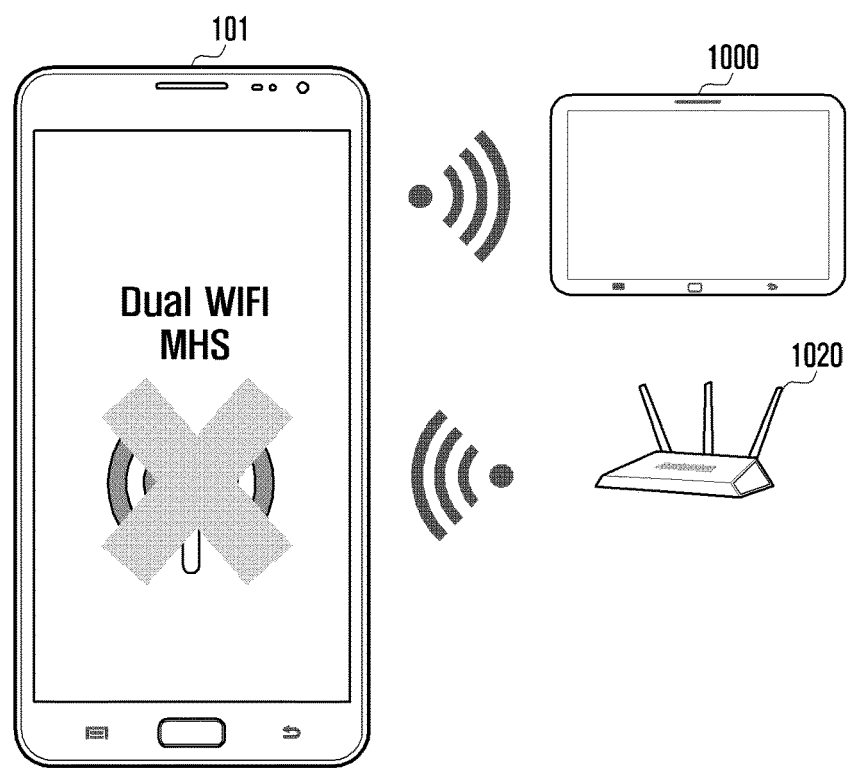

FIG. 10 is a diagram illustrating an IP allocation of an electronic device 101 to a third external device 1020 while the electronic device 101 is connected to a first external device 1000 and a second external device 1010 according to various embodiments of the present disclosure.

An electronic device 101 according to an embodiment of the present disclosure may perform a connection to a first external device 1000 using a mobile hotspot function, and may perform WiFi connection to a second external device 1010. For example, the electronic device 101 may support the first external device 1000 to perform communication using a long term evolution (LTE) communication means or through a WiFi signal received from the second external device 1010.

A network for performing communication may be divided into a public network and a virtual network. Here, the public network may be allocated with a public IP address, for example, an address of 100.100.100.100. Here, the virtual network corresponds to a space in which the communication is performed in a predetermined area (e.g., communication area formed between a WiFi AP and a specific terminal), and may be allocated with a virtual IP address. For example, if access points (APs) for transmitting and receiving a plurality of short-range wireless communication (e.g., WiFi) signals exist for one terminal, the access points may be respectively allocated with IP addresses. As an additional example, the first access point may be allocated with an IP of 192.68.2.9, and the second access point may be allocated with an IP of 192.68.8.4.

The electronic device 101 according to an embodiment of the present disclosure is allocated with an IP when performing short-range wireless communication with the first external device 1000 and the second external device 1010. For example, the electronic device 101 may be allocated with 192.168.3.9 during the short-range wireless communication with the first external device 1000, and may be allocated with 192.168.8.4 during the short-range wireless communication with the second external device 1010.

The electronic device 101 according to an embodiment of the present disclosure may be located in a short-range wireless communication area of a third external device 1020 as it moves while performing the short-range wireless communication with the first external device 1000 and the second external device 1010. The electronic device 101 may identify an IP allocated to the third external device 1020. The electronic device 101 may identify whether the identified IP uses the same band as the band of the IP allocated to the first external device 1000. If the identified IP uses the same band, the electronic device 101 may control to change the IP allocated to the first external device 1000.

Figure 11:
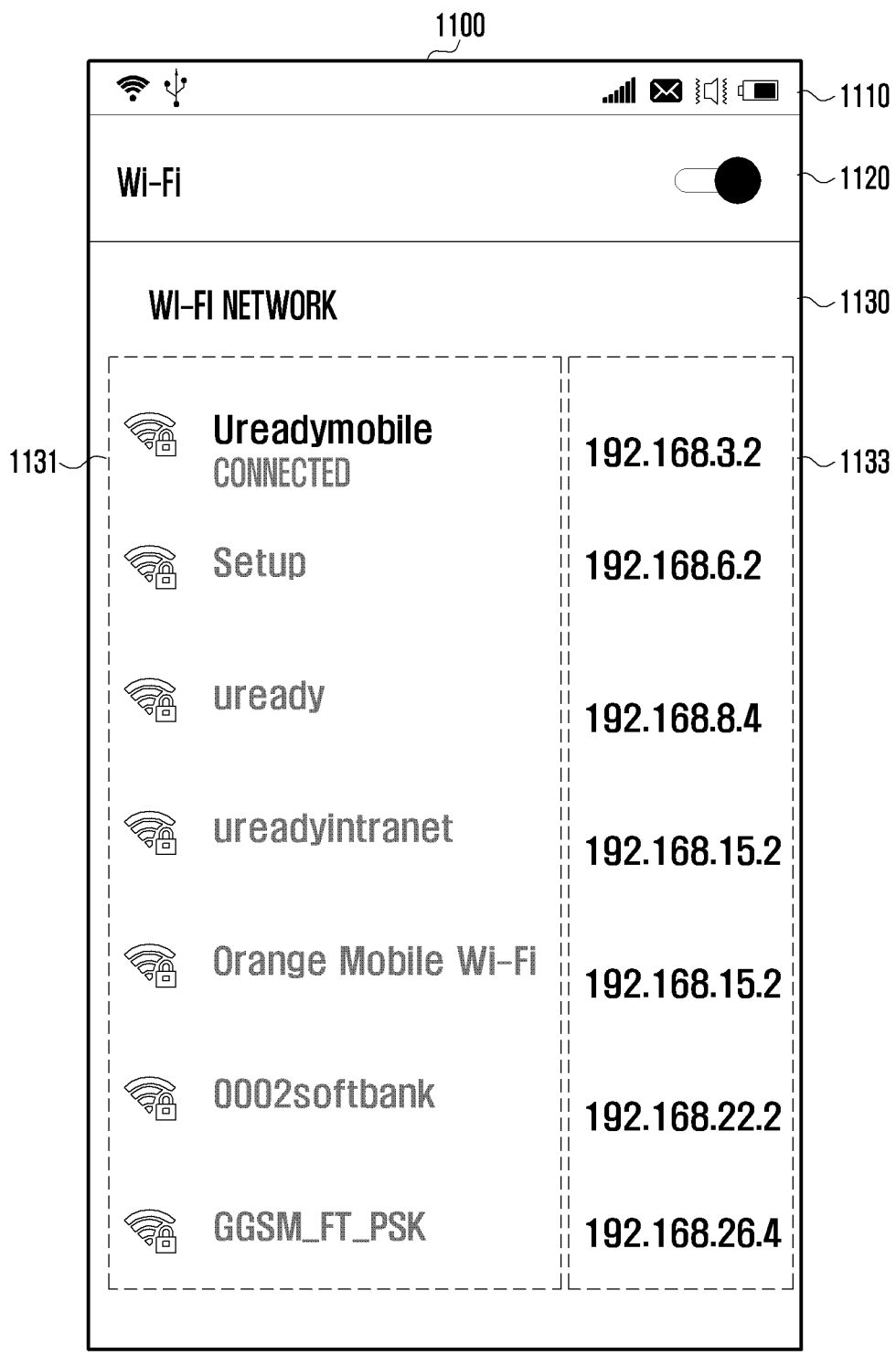
FIG. 11 is a diagram illustrating a screen of an electronic device related to IP allocation information of an external device according to various embodiments of the present disclosure.

FIG. 11 is a diagram illustrating a screen of an electronic device 101 related to IP allocation information of an external device according to various embodiments of the present disclosure.

An electronic device 101 according to an embodiment of the present disclosure may store therein IP information of a plurality of external devices. FIG. 11 illustrates an example in which information of the plurality of external devices stored in the electronic device 101 is displayed on one screen 1100.

The one screen 1100 of the electronic device 101 may include an indictor area 1110, a WiFi selection area 1120, and a WiFi information area 1130. An AP 1131 and IP information 1133 corresponding to the AP may be included on the WiFi information area 1130.

The electronic device 101 according to an embodiment of the present disclosure may determine an IP allocated when accessing another external device based on IP information corresponding to the pre-stored AP. The electronic device 101 according to an embodiment may determine an IP allocation of a device connected to a client during a short-range wireless communication (e.g., mobile hotspot) operation based on the IP corresponding to the pre-stored AP. For example, the electronic device 101 may support to allocate an IP to the client performing the short-range wireless communication to avoid IP information corresponding to frequently used APs during the IP allocation of the client. As an additional example, the electronic device 101 may support to allocate an IP band that is not frequently used in client devices performing the hotspot function to a WiFi AP.

For example, the electronic device 101 may identify IP information 192.168.3.2 of "Ureadymobile" among pre-stored APs, and may control to preferentially connect "Ureadymobile" if it is determined that the identified IP information has low IP collisions with other devices.

Figure 12:
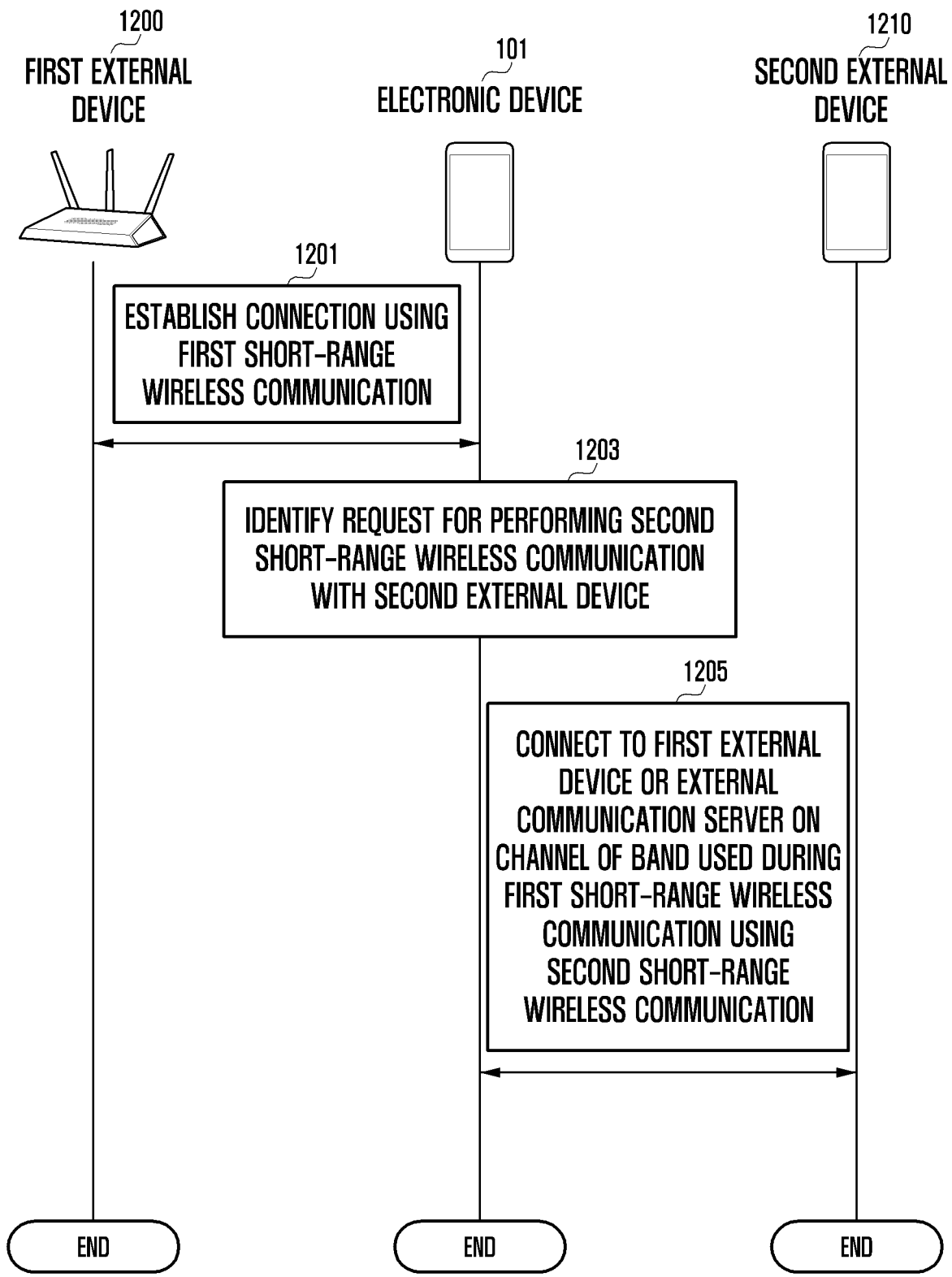
FIG. 12 is a flowchart explaining a communication connection of an electronic device to a first external device and a second external device according to various embodiments of the present disclosure.

FIG. 12 is a flowchart explaining a communication connection of an electronic device 101 to a first external device 1200 and a second external device 1210 according to various embodiments of the present disclosure.

At operation 1201, the electronic device 101 may establish a connection using a first short-range wireless communication. The electronic device 101 according to an embodiment of the present disclosure may perform the first short-range wireless communication with the first external device 1200. For example, the electronic device 101 may establish a WiFi connection with the first external device 1200 that is a WiFi AP.

At operation 1203, the electronic device 101 may identify a request for performing a second short-range wireless communication with the second external device 1210. The electronic device 101 according to an embodiment of the present disclosure may identify a signal for requesting a wireless LAN service (e.g., hotspot).

At operation 1205, the electronic device 101 may connect to the first external device or an external communication server on a channel of a band used during the first short-range wireless communication using the second short-range wireless communication. The electronic device 101 according to an embodiment of the present disclosure may connect to the first external device 1200 or the external communication server on the channel of the band used during the first short-range wireless communication (e.g., WiFi) using the second short-range wireless communication (e.g., hotspot communication) in response to the request signal.

When controlling to connect the second external device 1210 to the first external device 1200 or the external communication server, the electronic device 101 according to an embodiment of the present disclosure may compare IP band information allocated to the second external device 1210 with IP band information allocated to the first external device 1200 connected thereto. The electronic device 101 may determine whether to reallocate the IP band information of the second external device 1210 based on the comparison result of the IP band information.

Figure 13:
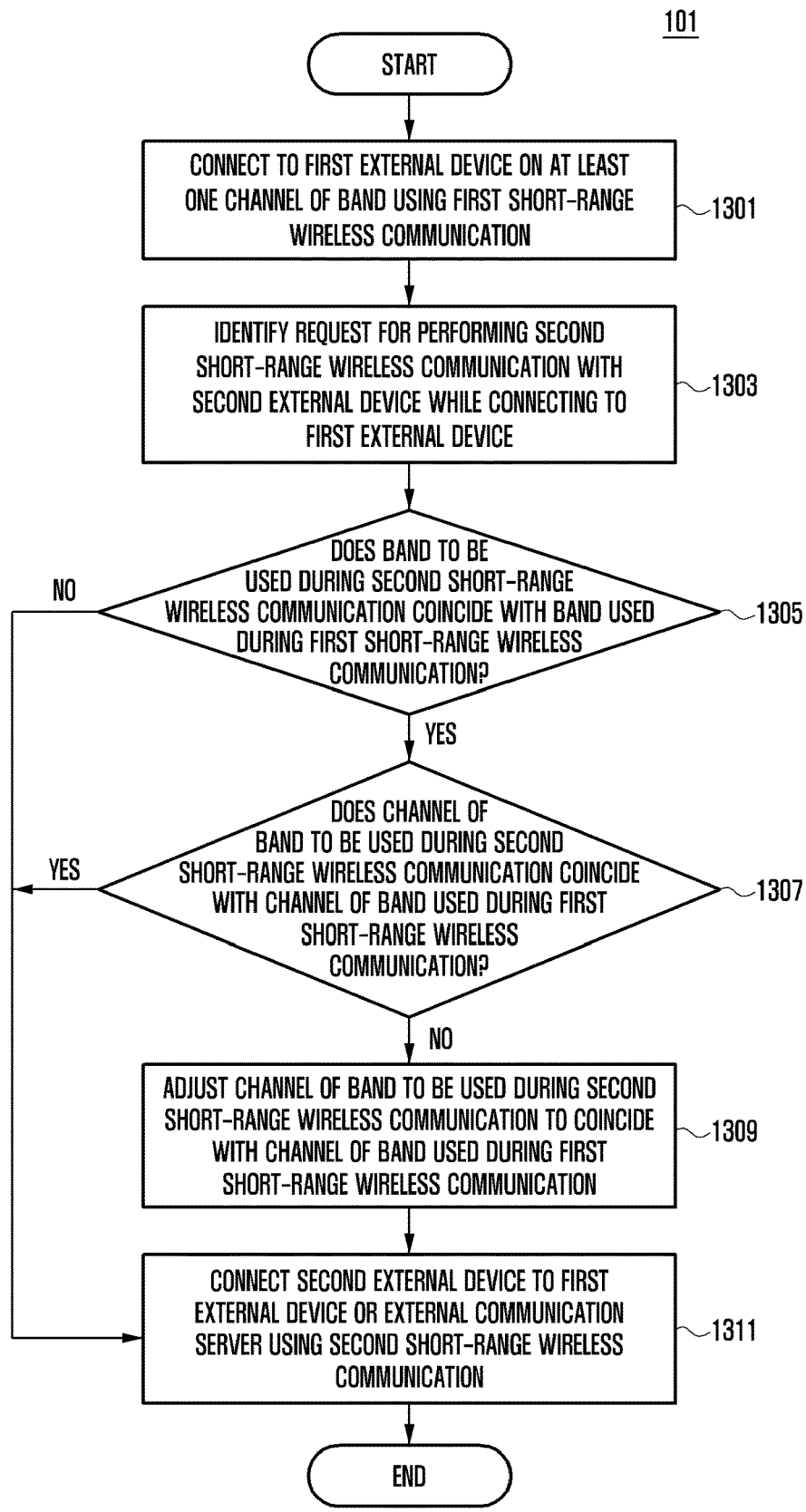
FIG. 13 is a flowchart explaining a communication connection of an electronic device to a second external device while the electronic device is connected to a first external device according to various embodiments of the present disclosure.

FIG. 13 is a flowchart explaining a communication connection of an electronic device 101 to a second external device while the electronic device is connected to a first external device according to various embodiments of the present disclosure.

At operation 1301, the electronic device 101 may connect to the first external device on at least one channel of a band using a first short-range wireless communication. The electronic device 101 according to an embodiment of the present disclosure may connect to the first external device (e.g., WiFi AP) on one channel of a WiFi communication band using the first short-range wireless communication.

At operation 1303, the electronic device 101 may identify a request for performing a second short-range wireless communication with the second external device while connecting to the first external device. The electronic device 101 according to an embodiment of the present disclosure may request the second short-range wireless communication (e.g., hotspot) with the second external device (e.g., other terminal devices) while connecting to the first external device (e.g., WiFi AP).

At operation 1305, the electronic device 101 may determine whether a band to be used during the second short-range wireless communication coincides with the band used during the first short-range wireless communication. The electronic device 101 according to an embodiment of the present disclosure may determine whether the hotspot communication band to be used during the second short-range wireless communication coincides with the WiFi communication band used during the first short-range wireless communication. If the band to be used during the second short-range wireless communication does not coincide with the channel of the band used during the first short-range wireless communication at operation 1305, the electronic device 101 may connect the second external device to the first external device or the external communication server using the second short-range wireless communication at operation 1311.

At operation 1307, if the band to be used during the second short-range wireless communication coincides with the band used during the first short-range wireless communication, the electronic device 101 may determine whether the channel of the band to be used during the second short-range wireless communication coincides with the channel of the band used during the first short-range wireless communication. The electronic device 101 according to an embodiment of the present disclosure may determine whether the channel of the band to be used during the second short-range wireless communication coincides with the channel of the band used during the first short-range wireless communication (e.g., WiFi). If the channel of the band to be used during the second short-range wireless communication does not coincide with the channel of the band used during the first short-range wireless communication at operation 1307, the electronic device 101 may connect the second external device to the first external device or the external communication server using the second short-range wireless communication at operation 1311.

At operation 1309, if the channel of the band to be used during the second short-range wireless communication does not coincide with the channel of the band used during the first short-range wireless communication, the electronic device 101 may adjust the channel of the band to be used during the second short-range wireless communication to coincide with the channel used during the first short-range wireless communication. The electronic device according to an embodiment of the present disclosure may adjust the channel of the band to be used during the hotspot communication to coincide with the channel used during the WiFi communication.

At operation 1311, the electronic device 101 may connect the second external device to the first external device or the external communication server using the second short-range wireless communication. The electronic device 101 may perform operation 1311 if the band to be used during the second short-range wireless communication does not coincide with the band used during the first short-range wireless communication at operation 1305, or if the channel of the band to be used during the second short-range wireless communication coincides with the channel of the band used during the first short-range wireless communication at operation 1307. The electronic device 101 according to an embodiment of the present disclosure may control the WiFi AP or external base station to be connected to other terminal devices based on the changed hotspot channel.

Figure 14:
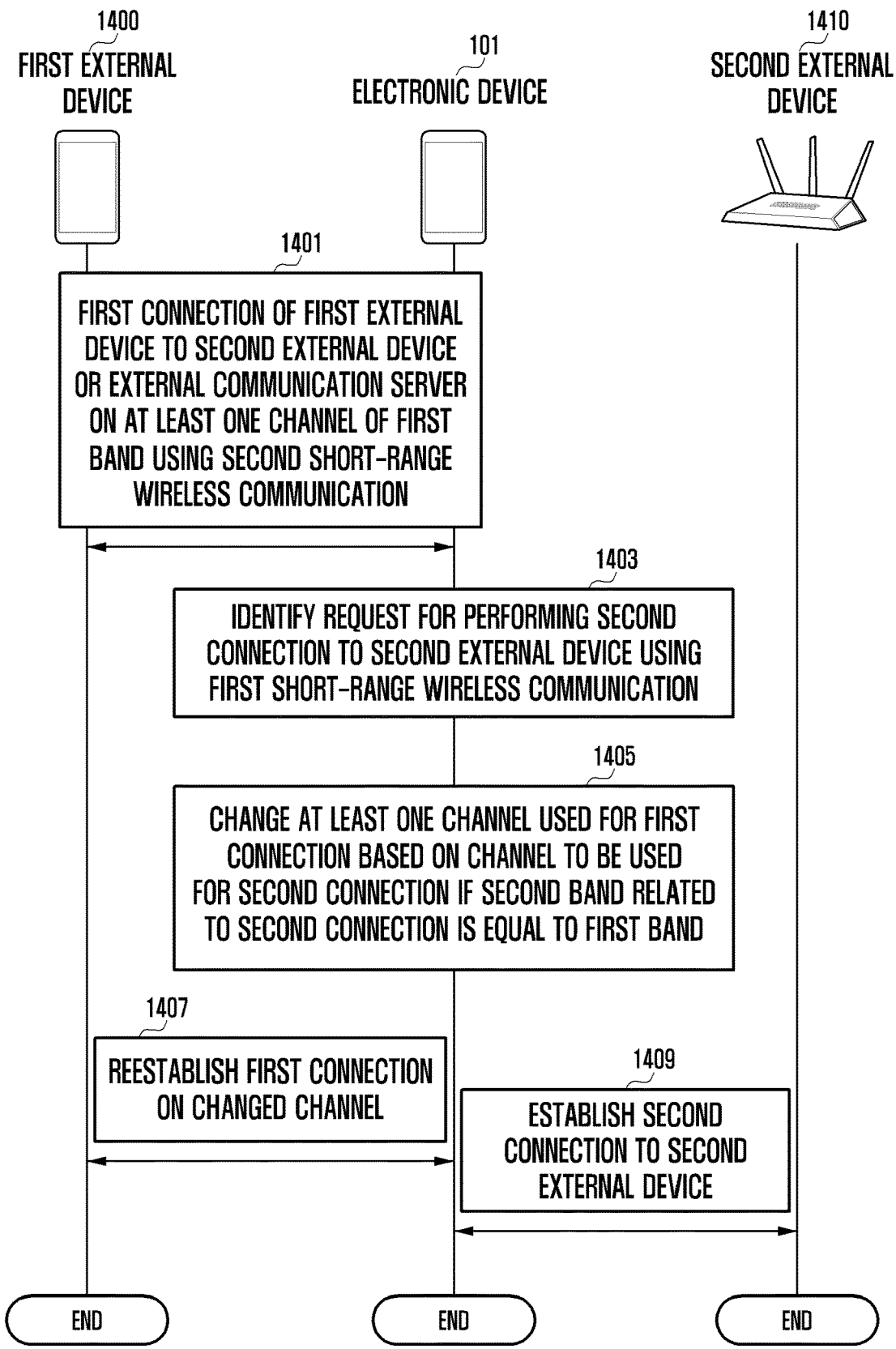
FIG. 14 is a flowchart explaining a communication connection of an electronic device to a first external device and a second external device according to various embodiments of the present disclosure.

FIG. 14 is a flowchart explaining a communication connection of an electronic device 101 to a first external device 1400 and a second external device 1410 according to various embodiments of the present disclosure.

At operation 1401, the electronic device 101 may establish a first connection of the first external device to the second external device or an external communication server on at least one channel of a first band using a second short-range wireless communication. The electronic device 101 according to an embodiment of the present disclosure may connect other devices to a WiFi AP or an external base station on a communication band of a wireless LAN service through a wireless LAN service (e.g., hotspot).

At operation 1403, the electronic device 101 may identify a request for performing a second connection to the second external device using the first short-range wireless communication. The electronic device 101 according to an embodiment of the present disclosure may identify the request for performing the connection to the second external device 1410 using WiFi communication.

At operation 1405, if a second band related to the second connection is equal to the first band, the electronic device 101 may change at least one channel used for the first connection based on a channel to be used for the second connection. If a band related to a WiFi connection is equal to a communication band of hotspot, the electronic device 101 according to an embodiment of the present disclosure may change the at least one channel used for the hotspot connection based on the channel to be used for the WiFi connection.

The electronic device 101 reestablishes the first connection on the changed channel. The electronic device 101 according to an embodiment of the present disclosure may reestablish the hotspot connection of the first external device 1400 on the changed channel.

At operation 1409, the electronic device 101 may establish the second connection to the second external device 1410.

Figure 15:
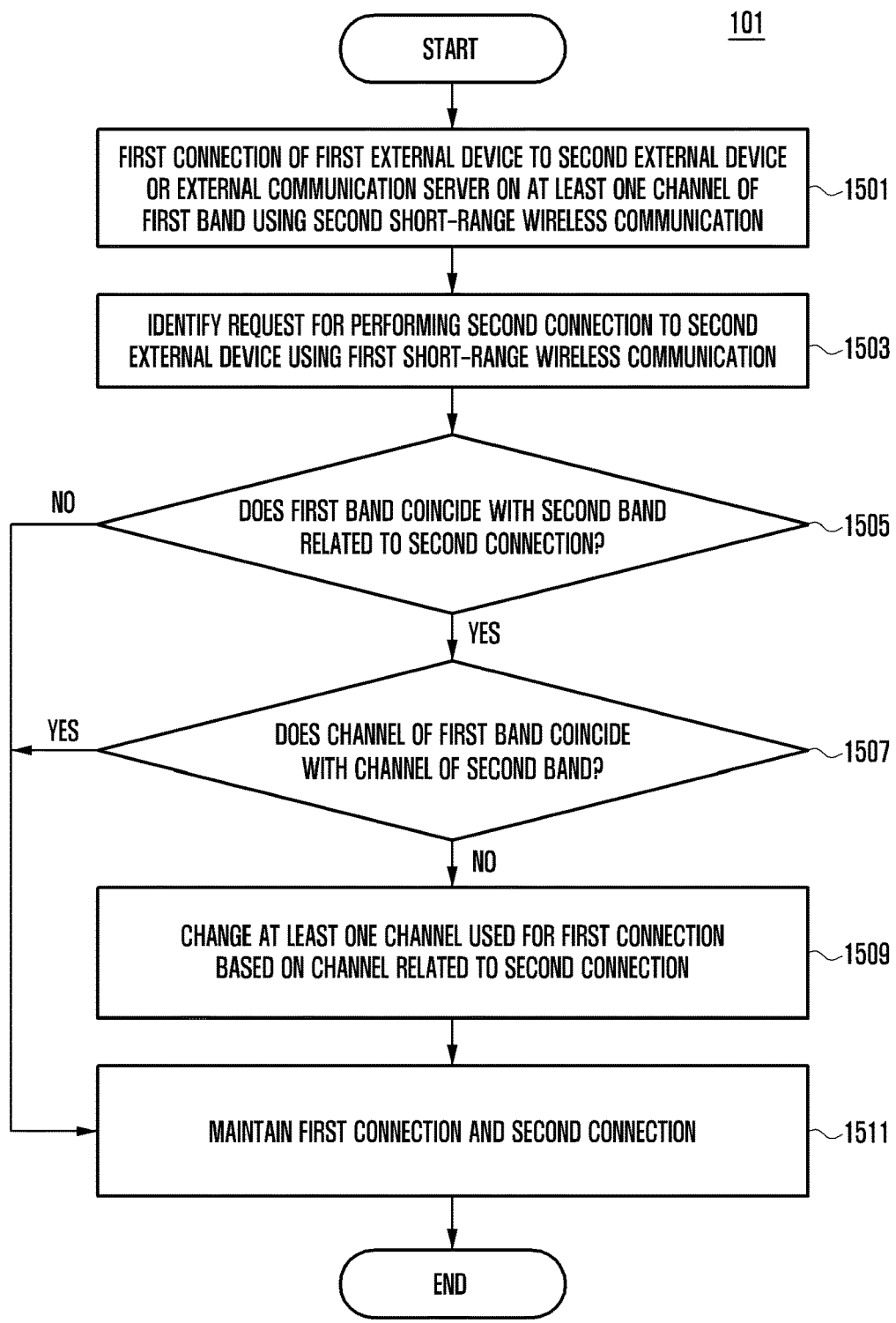
FIG. 15 is a flowchart illustrating a communication connection of an electronic device to a second external device while the electronic device is connected to a first external device according to various embodiments of the present disclosure.

FIG. 15 is a flowchart illustrating a communication connection of an electronic device 101 to a second external device while the electronic device is connected to a first external device according to various embodiments of the present disclosure.

At operation 1501, the electronic device 101 may establish a first connection of the first external device to the second external device or an external communication server on at least one channel of a first band using a second short-range wireless communication. The electronic device 101 according to an embodiment of the present disclosure may connect other external terminals to a WiFi AP or an external base station on at least one channel of the band using a wireless LAN service (e.g., hotspot).

At operation 1503, the electronic device 101 may identify a request for performing a second connection with the second external device using a first short-range wireless communication. The electronic device 101 according to an embodiment of the present disclosure may identify a request signal for performing a connection to the WiFi AP using WiFi communication.

At operation 1505, the electronic device 101 may determine whether the first band coincides with a second band related to the second connection. The electronic device according to an embodiment of the present disclosure may determine whether a WiFi communication band coincides with a hotspot communication band. If the first band and the second band related to the second connection do not coincide with each other at operation 1505, the electronic device 101 may maintain the first connection and the second connection at operation 1511.

At operation 1507, if the first band coincides with the channel of the second band, the electronic device 101 may determine whether the channel of the first band coincides with the channel of the second band. If the WiFi communication band coincides with the hotspot communication band, the electronic device 101 according to an embodiment of the present disclosure may determine whether the channel of the WiFi band coincides with the channel of the hotspot communication band. If the channel of the first band coincides with the channel of the second band at operation 1507, the electronic device 101 may maintain the first connection and the second connection at operation 1511.

At operation 1509, if the channel of the first band does not coincide with the channel of the second band, the electronic device 101 may change at least one channel used for the first connection based on the channel related to the second connection. If the channel of the WiFi communication band does not coincide with the channel of the hotspot communication band, the electronic device 101 according to an embodiment of the present disclosure may change the channel used for the hotspot communication connection based on the channel related to the WiFi communication connection.

If the second band is different from the first band, the electronic device 101 may control to perform the communication without changing the at least one channel used for the first connection.

If the second band is equal to the first band, the processor 120 according to an embodiment of the present disclosure may control to perform at least one of an operation of displaying on a screen a notification item including information about a temporary communication disconnection possibility of the first connection when changing the at least one channel used for the first connection based on a channel to be used for the second connection, an operation of performing no communication with another external device until the at least one channel used for the first connection is changed to coincide with the channel to be used for the second connection, and an operation of displaying on the screen a change item including information for requesting a channel change of the first band.

At operation 1511, the electronic device 101 may maintain the first connection and the second connection. The electronic device 101 may perform the operation 1511 if the first band and the second band related to the second connection do not coincide with each other at operation 1505, or if the channel of the first band and the channel of the second band coincide with each other at operation 1507.

The electronic device 101 according to an embodiment of the present disclosure may identify a communication performance request for a plurality of external devices to replace the second external device while the first connection and the second connection are established.

The electronic device 101 according to an embodiment of the present disclosure may identify pre-stored communication bands of the plurality of external devices and channel information of the communication bands.

The electronic device 101 according to an embodiment of the present disclosure may determine one of the plurality of external devices as a device to replace the second external device based on the identified communication band information and channel information. The electronic device 101 according to an embodiment may establish a third connection to the determined device in replacement of the second connection.

If the communication with the second external device is interrupted while the first connection and the second connection are established, the electronic device 101 according to an embodiment of the present disclosure may perform the communication using another wireless communication method (e.g., long term evolution (LTE)).

Figure 16:
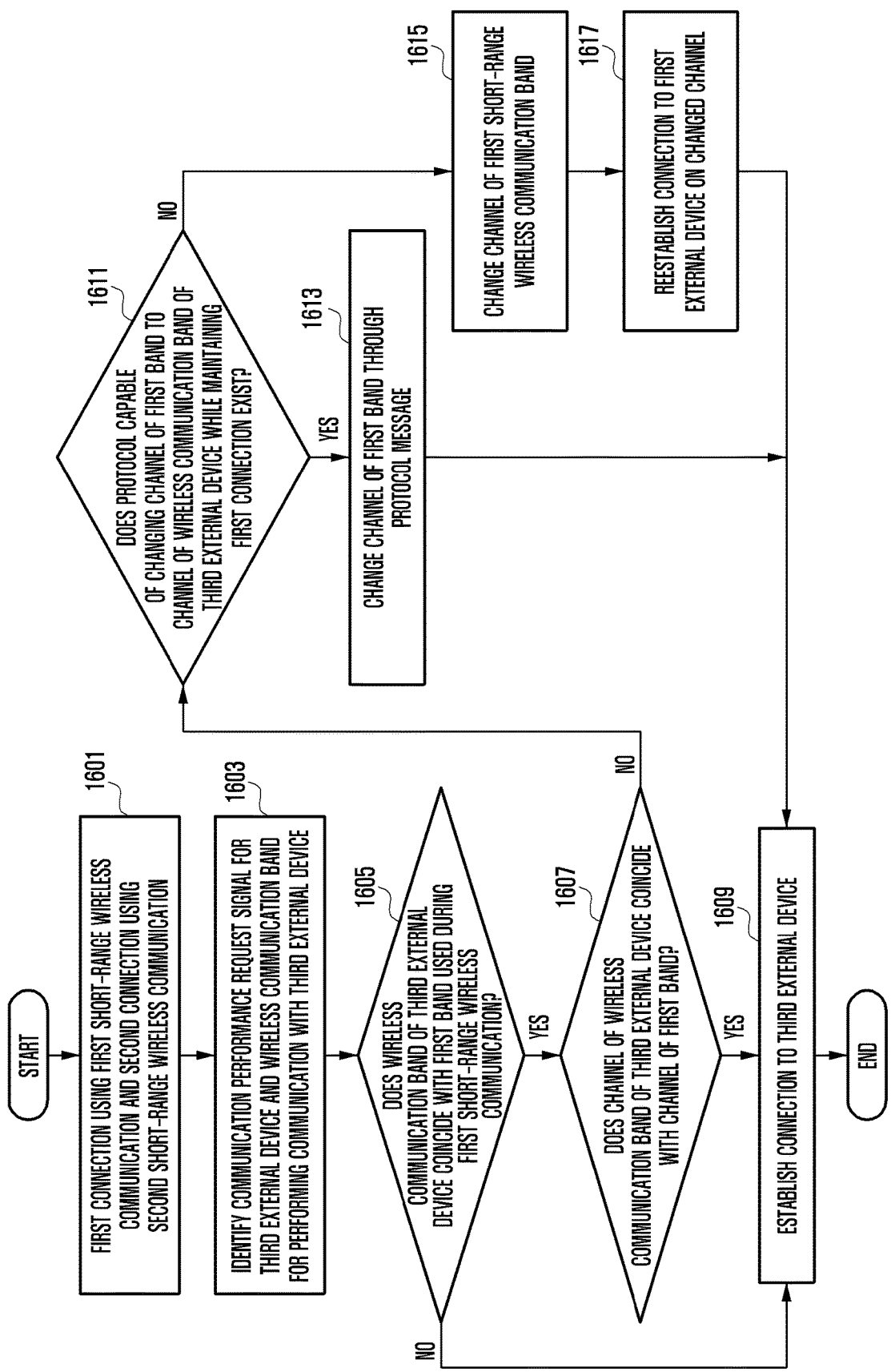
FIG. 16 is a flowchart explaining a communication connection of an electronic device to a third external device while the electronic device is connected to a first external device and a second external device according to various embodiments of the present disclosure.

FIG. 16 is a flowchart explaining a communication connection of an electronic device 101 to a third external device while the electronic device is connected to a first external device and a second external device according to various embodiments of the present disclosure.

At operation 1601, the electronic device 101 may establish a first connection using a first short-range wireless communication and a second connection using a second short-range wireless communication. The electronic device 101 according to an embodiment of the present disclosure may establish the first connection using a wireless LAN service (e.g., hotspot) and the second connection using a WiFi communication.

At operation 1603, the electronic device 101 may identify a communication performance request signal for the third external device and a wireless communication band for performing communication with the third external device. The electronic device 101 according to an embodiment of the present disclosure may identify a communication performance request signal for another WiFi AP and a wireless communication band for performing communication with the WiFi AP.

At operation 1605, the electronic device 101 may determine whether the wireless communication band of the third external device coincides with the first band used during the first short-range wireless communication. The electronic device 101 according to an embodiment of the present disclosure may determine whether the wireless communication band of another WiFi AP coincides with the band used during hotspot communication.

At operation 1607, if the wireless communication band of the third external device coincides with the first band used during the first short-range wireless communication, the electronic device 101 may determine whether the channel of the wireless communication band of the third external device coincides with the channel of the first band. If the wireless communication band of another WiFi AP coincides with the band used during the hotspot communication, the electronic device 101 according to an embodiment of the present disclosure may determine whether the channel of the wireless communication band of another WiFi AP coincides with the channel of the hotspot communication band.

At operation 1609, if the channel of the wireless communication band of the third external device coincides with the channel of the first band, the electronic device 101 may establish a connection to the third external device. If the channel of the wireless communication band of another WiFi AP coincides with the channel of the hotspot communication band, the electronic device 101 according to an embodiment of the present disclosure may establish another WiFi AP connection.

At operation 1611, if the channel of the wireless communication band of the third external device 101 does not coincide with the channel of the first band, the electronic device 101 may determine whether a protocol capable of changing the channel of the first band to the channel of the wireless communication band of the third external device while maintaining the first connection exists. If the channel of the wireless communication band of another WiFi AP does not coincide with the channel of the hotspot band, the electronic device 101 according to an embodiment may determine whether the protocol capable of changing the channel of the first band to the channel of the wireless communication band of another WiFi AP while maintaining the first connection exists. The protocol may be a 11v BSSTRANS protocol, and may be rules included in any one of the communication standards IEEE 802.11 a/b/g/n/ac.

At operation 1613, if the protocol capable of changing the channel of the first band to the channel of the wireless communication band of the third external device while maintaining the first connection exists, the electronic device 101 may change the channel of the first band through a protocol message. The electronic device 101 according to an embodiment of the present disclosure may control to change the channel of the communication band without disconnection from the first external device (e.g., other terminals) using a BSSTRANS message. Here, the BSSTRANS message may be rules included in any one of the communication standards IEEE 802.11 a/b/g/n/ac.

At operation 1615, if the protocol capable of changing the channel of the first band to the channel of the wireless communication band of the third external device while maintaining the first connection does not exist, the electronic device 101 may change the channel of the first short-range wireless communication band. The electronic device 101 according to an embodiment of the present disclosure may change the communication band channel of the hotspot.

At operation 1617, the electronic device 101 may reestablish the connection to the first external device on the changed channel. The electronic device 101 according to an embodiment of the present disclosure may reestablish the hotspot communication connection with other devices on the changed channel.

Figure 17:
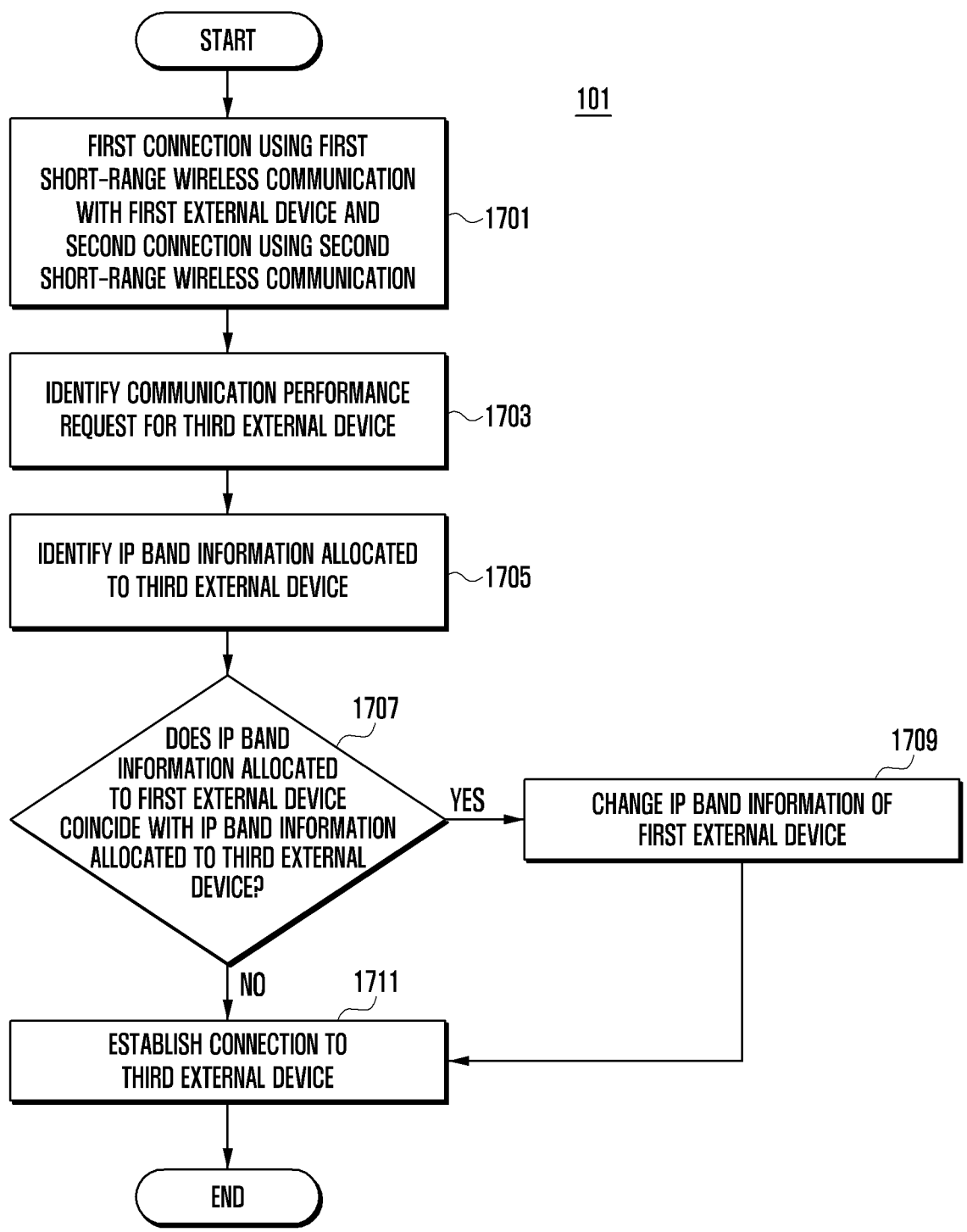
FIG. 17 is a flowchart explaining an IP allocation of an electronic device to a third external device while the electronic device is connected to a first external device and a second external device according to various embodiments of the present disclosure.

FIG. 17 is a flowchart explaining an IP allocation of an electronic device 101 to a third external device while the electronic device is connected to a first external device and a second external device according to various embodiments of the present disclosure.

At operation 1701, the electronic device 101 may establish a first connection to the first external device using a first short-range wireless communication and a second connection using a second short-range wireless communication. The electronic device 101 according to an embodiment of the present disclosure may establish the first connection to other terminals using a wireless LAN service (e.g., hotspot), and may establish the connection using a WiFi communication.

At operation 1703, the electronic device 101 may identify a communication performance request signal for the third external device. The electronic device 101 according to an embodiment of the present disclosure may identify a communication performance request signal for another WiFi AP.

At operation 1705, the electronic device 101 may identify IP band information allocated to the third external device. The electronic device 101 according to an embodiment of the present disclosure may identify IP band information allocated to a WiFi AP. Here, the IP band information may mean addresses of respective devices on the Internet for discrimination from other devices. For example, the IP band information may be of Version 4 (IPv4), and may be composed of a number of 12 digits at maximum.

At operation 1707, the electronic device 101 may determine whether the IP band information allocated to the first external device coincides with the IP band information allocated to the third external device. The electronic device 101 according to an embodiment of the present disclosure may determine whether the IP band information allocated to another terminal device coincides with the IP band information allocated to another WiFi AP.

At operation 1709, if the IP band information allocated to the first external device coincides with the IP band information allocated to the third external device, the electronic device 101 may change the IP band information of the first external device. If the IP band information allocated to a wireless LAN service (e.g., hotspot) coincides with the IP band information allocated to the WiFi AP, the electronic device 101 according to an embodiment of the present disclosure may change the IP band information of another device.

At operation 1711, if the IP band information allocated to the first external device does not coincide with the IP band information allocated to the third external device, the electronic device 101 may establish a connection to the third external device. If the IP band information allocated to the first external device (e.g., another terminal device) does not coincide with the IP band information allocated to another WiFi AP, the electronic device 101 according to an embodiment of the present disclosure may maintain establishment of another WiFi AP connection. The electronic device 101 according to an embodiment of the present disclosure may maintain the hotspot communication performance of the first external device (e.g., another device) based on the changed IP band information after changing the IP band information used during the communication of the first external device (e.g., another device).

In case of determining an external device to perform communication connection among a plurality of external devices, the electronic device 101 according to an embodiment of the present disclosure may determine an external device to perform communication based on at least one of connection frequency information, IP allocation information of the first external device, and IP history allocation information of the second external device.

Figure 18A:
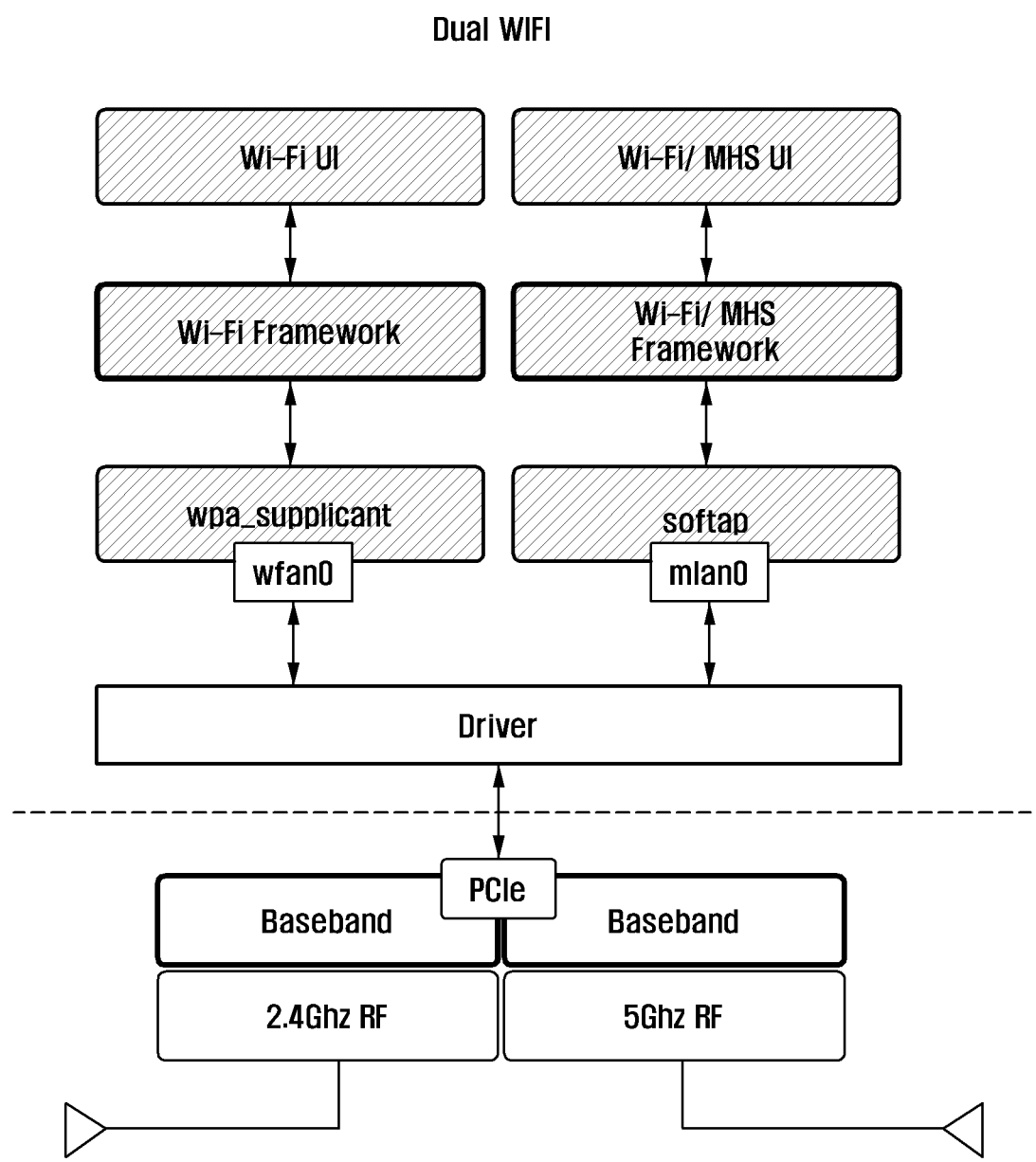
FIGS. 18A and 18B are diagrams illustrating WiFi structures and channels of the respective structures according to various embodiments of the present disclosure.
Figure 18B:
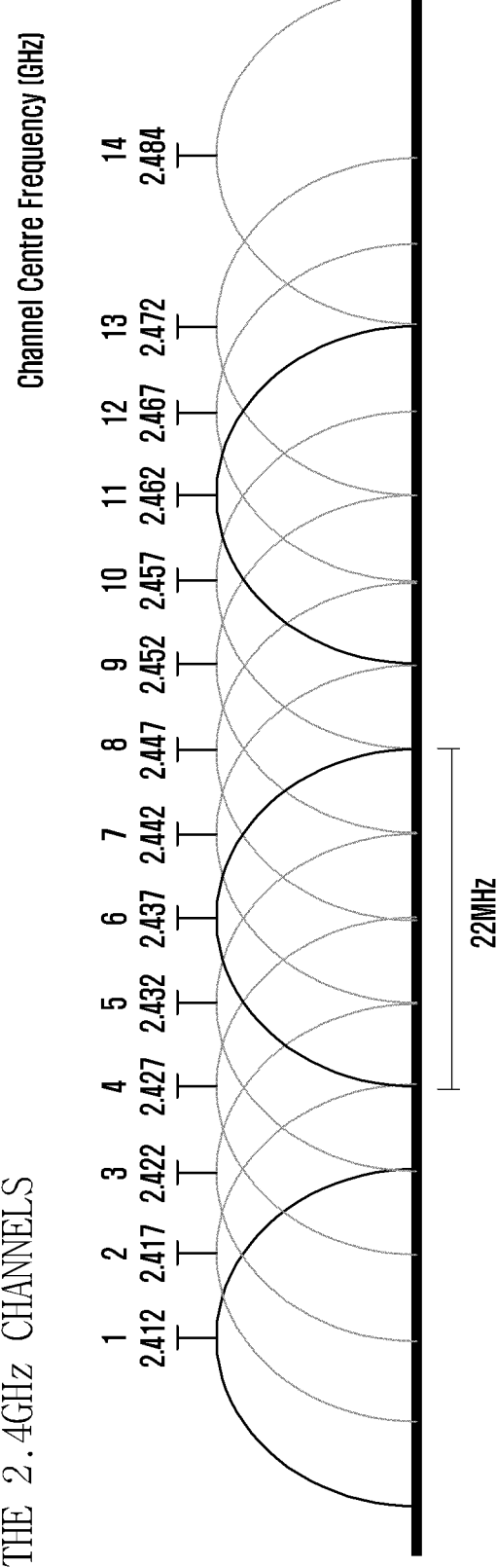
Figure 18B:
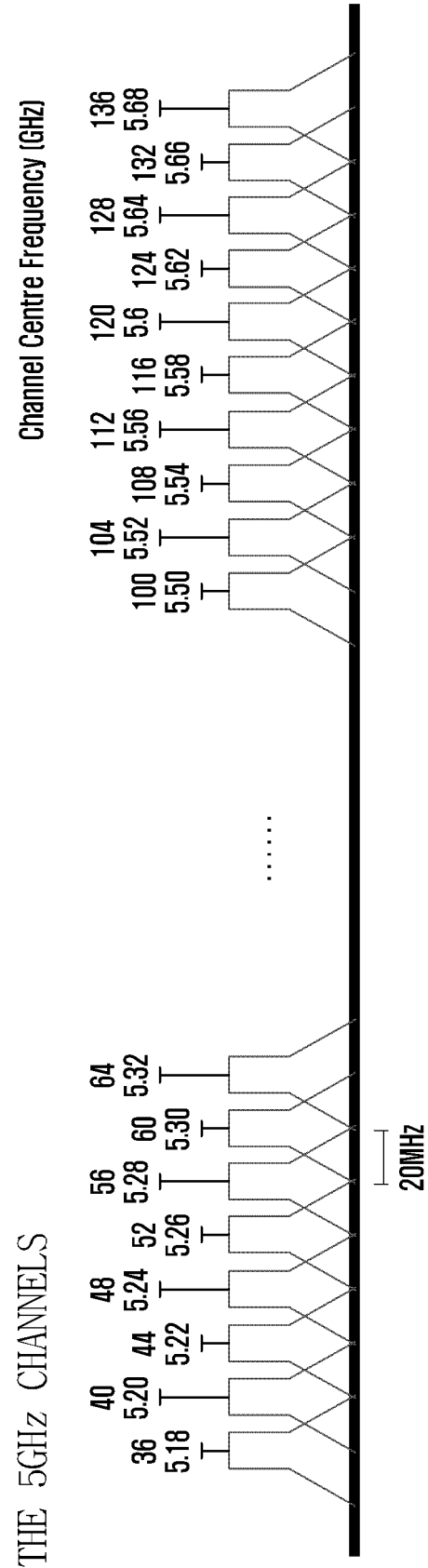

FIGS. 18A and 18B are diagrams illustrating WiFi structures and channels of the respective structures according to various embodiments of the present disclosure. FIG. 18A illustrates the structure of a dual WiFi. A WiFi framework for WiFi and a WiFi/MHS framework capable of using MHS UI are separately configured, and corresponding modules are composed of layers of wlan0/mlan0 to perform their operations separately. The corresponding modules may be connected to respective basebands through a driver to operate separately for 2.4 GHz and 5 GHz. Through the corresponding configurations two bands can be simultaneously used. In the corresponding drawing, "wpa_supplicant" and "softap" are modules taking charge of WiFi connection authentication in a client terminal and a mobile hotspot terminal. "wlan0" is an interface connecting the driver to wpa_supplicant or softap so that communication between them becomes possible. In the related art that does not support the dual WiFi, it is not possible to simultaneously turn on WiFi and mobile hotspot, and wlan0 interface is shared by wpa_supplicant or softap. However, as the dual WiFi is supported, respective interfaces are separately required, and thus a plurality of bands can be simultaneously used in a manner that the interface for wpa_supplicant is used for the existing wlan0 and the interface for softap is used for mlan0.

Referring to FIG. 18B, images related to a 2.4 GHz channel and 5 GHz channel are illustrated. The 5 GHz frequency band may include more channels than those of the 2.4 GHz frequency band. Further, the 5 GHz frequency band may have a narrower overlap than that of the 2.4 GHz frequency band between neighboring channels.

The channel according to the present disclosure may include at least one of communication band frequency related data and Internet protocol (IP) band related data.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a compact disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

In a computer readable storage medium recorded with a program, the program may include instructions executed by a processor to: establish a first connection of a first external device to a second external device or an external communication server on at least one channel of a first band using a second short-range wireless communication, identify a request for performing a second connection to the second external device using a first short-range wireless communication while the first external device is connected to the second external device or the external communication server, compare a second band related to the second connection with the first band in response to the request, and change the at least one channel used for the first connection based on a channel to be used for the second connection if the second band is equal to the first band.

In a computer readable storage medium recorded with a program, the program may include instructions executed by a processor to: connect to a first external device on at least one channel of a band using a first short-range wireless communication through the communication module, identify a request for performing a second short-range wireless communication with a second external device while connecting to the first external device, and connect the second external device to the first external device or an external communication server on the at least one channel of the band using the second short-range wireless communication in response to the request.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

The invention claimed is:

1. An electronic device comprising:
   a communication module configured to support a first short-range wireless communication and a second short-range wireless communication; and
   a processor functionally connected to the communication module and configured to:
      connect to a first external device on at least one channel of a band using the first short-range wireless communication through the communication module,
      identify a request for performing the second short-range wireless communication with a second external device while connected to the first external device, and
      connect the second external device to the first external device or an external communication server on the at least one channel of the band using the second short-range wireless communication in response to the request,
   wherein the first short-range wireless communication is a wireless communication used during establishment of a WiFi connection by accessing a radio access device, and the second short-range wireless communication is a wireless communication used during a hotspot connection to another electronic device.

2. The electronic device of claim 1, wherein the processor is configured to change a channel to be used during the second short-range wireless communication to be equal to the at least one channel used during the first short-range wireless communication.

3. The electronic device of claim 1, wherein the first external device comprises a radio access device, and the first short-range communication and the second short-range communication support the same protocol.

4. An electronic device comprising:
   a communication module configured to support a first short-range wireless communication and a second short-range wireless communication; and
   a processor functionally connected to the communication module and configured to:
      establish a first connection of a first external device to a second external device or an external communication server on at least one channel of a first band using the second short-range wireless communication through the communication module,
      identify a request for performing a second connection to the second external device using the first short-range wireless communication while the first external device is connected to the second external device or the external communication server,
      compare a second band related to the second connection with the first band in response to the request, and
      change the at least one channel used for the first connection based on a channel to be used for the second connection if the second band is equal to the first band,
   wherein the processor is configured to change the at least one channel used for the first connection to be equal to the channel used for the second connection if the second band is equal to the first band.

5. The electronic device of claim 4, wherein the processor is configured to perform communication without changing the at least one channel used for the first connection if the second band is different from the first band.

6. The electronic device of claim 4, wherein the processor is configured to: display on a screen a notification item including information about a temporary communication disconnection possibility of the first connection or display on the screen a change item including information for requesting a channel change of the first band.

7. The electronic device of claim 4, wherein the processor is configured to:
   identify a communication performance request for a plurality of external devices to replace the second external device while the first connection and the second connection are established,
   identify pre-stored communication bands of the plurality of external devices and channel information of the communication bands,
   determine a device to replace the second external device among the plurality of external devices based on the identified communication band information and channel information, and
   establish a third connection to the determined device in replacement of the second connection.

8. The electronic device of claim 4, wherein the processor is configured to:
   compare a first IP address allocated to the first external device with a second IP address allocated to the second external device, and
   change the first IP address to an IP address that is different from the second IP address based on the second IP address if the first IP address is equal to the second IP address.

9. The electronic device of claim 4, wherein the second external device comprises a radio access device.

10. A method in an electronic device supporting a first short-range wireless communication and a second short-range wireless communication, comprising:
   connecting to a first external device on at least one channel of a band using the first short-range wireless communication;
   identifying a request for performing the second short-range wireless communication with a second external device while connected to the first external device; and connecting the second external device to the first external device or an external communication server on the at least one channel of the band using the second short-range wireless communication in response to the request, wherein the first short-range wireless communication is a wireless communication used during establishment of a WiFi connection by accessing a radio access device, and the second short-range wireless communication is a wireless communication used during a hotspot connection to another electronic device.

11. The method of claim 10, wherein connecting the second external device to the first external device or the external communication server on the at least one channel of the band using the second short-range wireless communication comprises changing a channel to be used during the second short-range wireless communication to be equal to the at least one channel used during the first short-range wireless communication.

12. The method of claim 10, wherein the first external device comprises a radio access device, and the first short-range communication and the second short-range communication support the same protocol.

13. A method in an electronic device supporting a first short-range wireless communication and a second short-range wireless communication, comprising:

establishing a first connection of a first external device to a second external device or an external communication server on at least one channel of a first band using the second short-range wireless communication;

identifying a request for performing a second connection to the second external device using the first short-range wireless communication while the first external device is connected to the second external device or the external communication server;

comparing a second band related to the second connection with the first band in response to the request; and changing the at least one channel used for the first connection based on a channel to be used for the second connection if the second band is equal to the first band, wherein the first short-range wireless communication is a wireless communication used during establishment of a WiFi connection by accessing a radio access device, and the second short-range wireless communication is a wireless communication used during a hotspot connection to another electronic device.

14. The method of claim 13, further comprising:

identifying a communication performance request for a plurality of external devices to replace the second external device while the first connection and the second connection are established;

identifying pre-stored communication bands of the plurality of external devices and channel information of the communication bands;

determining a device to replace the second external device among the plurality of external devices based on the identified communication band information and channel information; and establishing a third connection to the determined device in replacement of the second connection.

15. The method of claim 13, wherein changing comprises:

comparing a first IP address allocated to the first external device with a second IP address allocated to the second external device; and changing the first IP address to an IP address that is different from the second IP address based on the second IP address if the first IP address is equal to the second IP address.

16. The method of claim 13, wherein the second external device comprises a radio access device, and the first short-range communication and the second short-range communication support the same protocol.

* * * * *